US009853713B2

(12) United States Patent
Jalali

(10) Patent No.: US 9,853,713 B2
(45) Date of Patent: Dec. 26, 2017

(54) UNMANNED AERIAL VEHICLE (UAV) BEAM POINTING AND DATA RATE OPTIMIZATION FOR HIGH THROUGHPUT BROADBAND ACCESS

(71) Applicant: UBIQOMM LLC, San Diego, CA (US)

(72) Inventor: Ahmad Jalali, San Diego, CA (US)

(73) Assignee: Ubiqomm LLC, San Diego, CA (US)

( * ) Notice: Subject to any disclaimer, the term of this patent is extended or adjusted under 35 U.S.C. 154(b) by 0 days.

(21) Appl. No.: 15/225,240

(22) Filed: Aug. 1, 2016

(65) Prior Publication Data

US 2017/0324463 A1 Nov. 9, 2017

Related U.S. Application Data

(60) Provisional application No. 62/333,088, filed on May 6, 2016.

(51) Int. Cl.
*H04W 4/00* (2009.01)
*H04B 7/185* (2006.01)
(Continued)

(52) U.S. Cl.
CPC ........... *H04B 7/18504* (2013.01); *H01Q 1/28* (2013.01); *H04B 7/18578* (2013.01);
(Continued)

(58) Field of Classification Search
USPC ........................................................ 455/431
See application file for complete search history.

(56) References Cited

U.S. PATENT DOCUMENTS 3,568,197 A 3/1971 Harold
3,780,303 A 12/1973 Smith et al.
(Continued)

FOREIGN PATENT DOCUMENTS

CA 2316440 A1 2/2001
EP 2369361 A1 9/2011
(Continued)

OTHER PUBLICATIONS

Goldsmith A.J., et al., "Design Challenges for Energy-Constrained Ad Hoc Wireless Networks," Wireless Communications, IEEE, 2002, vol. 9 (4), pp. 8-27.

*Primary Examiner* — Joel Ajayi
(74) *Attorney, Agent, or Firm* — Gazdzinski & Associates, PC

(57) ABSTRACT

Systems and methods configured to form and manage different types of beams toward target ground terminals to "optimally" communicate with the terminals. In one set of embodiments, the UAV generates a set of beams to cover cells on the ground, the beams are divided into groups, and the UAV communications system deterministically and sequentially turns a subset of the beams on/off to reduce cross-beam interference and increase system throughput. In another embodiment, in order to increase throughput, the UAV communications system determines the highest data rate on the downlink and uplink that are decodable at the receiver given the received signal to interference plus noise ratio (SINR) while maintaining a low packet error rate. Systems and methods are described to determine the UAV antenna pattern toward different terminals needed for SINR calculation and data rate determination.

16 Claims, 11 Drawing Sheets

(51) Int. Cl.

| | | |
|---|---|---|
| *H04W 16/26* | (2009.01) | |
| *H04W 64/00* | (2009.01) | |
| *H04W 36/00* | (2009.01) | |
| *H04W 36/30* | (2009.01) | |
| *H01Q 1/28* | (2006.01) | |
| *H04W 72/12* | (2009.01) | |
| *H04W 16/28* | (2009.01) | |
| *H04W 72/04* | (2009.01) | |

(52) U.S. Cl.
CPC ............ *H04W 16/26* (2013.01); *H04W 16/28* (2013.01); *H04W 36/0083* (2013.01); *H04W 36/30* (2013.01); *H04W 64/00* (2013.01); *H04W 72/121* (2013.01); *H04W 72/046* (2013.01); *H04W 72/0446* (2013.01); *H04W 72/0453* (2013.01)

(56) References Cited

U.S. PATENT DOCUMENTS

| | | |
|---|---|---|
| 3,891,985 A | 6/1975 | Oigarden et al. |
| 4,209,695 A | 6/1980 | Arnold et al. |
| 4,278,885 A | 7/1981 | Von et al. |
| 4,317,993 A | 3/1982 | Hertzog, Jr. et al. |
| 4,365,154 A | 12/1982 | Arnold et al. |
| 4,387,302 A | 6/1983 | Givens |
| 4,499,380 A | 2/1985 | Aggour et al. |
| 4,851,687 A | 7/1989 | Ettinger et al. |
| 5,021,664 A | 6/1991 | Hinshaw |
| 5,068,532 A | 11/1991 | Wormald et al. |
| 5,076,993 A | 12/1991 | Sawa et al. |
| 5,098,640 A | 3/1992 | Gozani et al. |
| 5,239,568 A | 8/1993 | Grenier |
| 5,521,817 A | 5/1996 | Burdoin et al. |
| 5,561,434 A | 10/1996 | Yamazaki |
| 5,712,885 A | 1/1998 | Sowerby et al. |
| 5,832,379 A | 11/1998 | Mallinckrodt |
| 6,018,659 A | 1/2000 | Ayyagari et al. |
| 6,034,634 A | 3/2000 | Karlsson et al. |
| 6,044,323 A | 3/2000 | Yee et al. |
| 6,061,562 A | 5/2000 | Martin et al. |
| 6,108,538 A | 8/2000 | Blasiak et al. |
| 6,144,032 A | 11/2000 | Gazdzinski |
| 6,256,476 B1 | 7/2001 | Beamish et al. |
| 6,281,838 B1 | 8/2001 | Hong |
| 6,513,758 B1 | 2/2003 | Lloyd |
| 6,628,941 B2 | 9/2003 | Knoblach et al. |
| 6,718,161 B1 | 4/2004 | Westall et al. |
| 6,756,937 B1 | 6/2004 | Chang et al. |
| 6,856,803 B1 | 2/2005 | Gross et al. |
| 6,873,301 B1 | 3/2005 | Lopez |
| 7,095,376 B1 | 8/2006 | Timothy et al. |
| 7,212,170 B1 | 5/2007 | Dean et al. |
| 7,777,674 B1 | 8/2010 | Haddadin et al. |
| 8,078,162 B2 | 12/2011 | Deaton et al. |
| 8,116,763 B1 | 2/2012 | Olsen |
| 8,183,999 B1 | 5/2012 | Giallorenzi et al. |
| 8,190,147 B2 | 5/2012 | Kauffman et al. |
| 8,558,734 B1 | 10/2013 | Piesinger |
| 8,897,770 B1 | 11/2014 | Frolov et al. |
| 9,100,086 B1 | 8/2015 | Olsen |
| 9,119,179 B1 | 8/2015 | Firoiu et al. |
| 9,488,981 B2 | 11/2016 | Pillai et al. |
| 9,590,720 B2 | 3/2017 | Jalali |
| 2002/0061730 A1 | 5/2002 | Hart et al. |
| 2002/0168974 A1 | 11/2002 | Rosen et al. |
| 2003/0040274 A1 | 2/2003 | Dai et al. |
| 2003/0095067 A1 | 5/2003 | Howell |
| 2003/0223354 A1 | 12/2003 | Olszewski |
| 2004/0038658 A1 | 2/2004 | Gurelli et al. |
| 2004/0152480 A1 | 8/2004 | Willars et al. |
| 2005/0035897 A1 | 2/2005 | Perl et al. |
| 2005/0107077 A1 | 5/2005 | Hintermeier et al. |
| 2005/0108374 A1 | 5/2005 | Pierzga et al. |
| 2005/0143005 A1 | 6/2005 | Moore, III |
| 2005/0243005 A1 | 11/2005 | Rafi et al. |
| 2005/0264438 A1 | 12/2005 | Fullerton et al. |
| 2006/0009262 A1 | 1/2006 | Hamm |
| 2006/0063566 A1 | 3/2006 | Maruta |
| 2006/0238411 A1 | 10/2006 | Fullerton et al. |
| 2007/0090990 A1 | 4/2007 | Nelson |
| 2007/0184849 A1 | 8/2007 | Zheng |
| 2007/0224931 A1 | 9/2007 | Fitton et al. |
| 2007/0230419 A1 | 10/2007 | Raman et al. |
| 2008/0090606 A1 | 4/2008 | Hwang et al. |
| 2008/0117858 A1 | 5/2008 | Kauffman |
| 2008/0233865 A1 | 9/2008 | Malarky et al. |
| 2009/0092072 A1 | 4/2009 | Imamura et al. |
| 2009/0209277 A1 | 8/2009 | Pinchas et al. |
| 2009/0219912 A1 | 9/2009 | Wengerter et al. |
| 2009/0295485 A1 | 12/2009 | Mitchell |
| 2009/0296663 A1 | 12/2009 | Wild |
| 2010/0085236 A1 | 4/2010 | Franceschini et al. |
| 2010/0172299 A1 | 7/2010 | Fischer et al. |
| 2010/0224732 A1 | 9/2010 | Olson et al. |
| 2010/0273504 A1 | 10/2010 | Bull et al. |
| 2010/0284377 A1 | 11/2010 | Wei et al. |
| 2010/0290412 A1 | 11/2010 | Ahn et al. |
| 2011/0032149 A1 | 2/2011 | Leabman |
| 2011/0103293 A1 | 5/2011 | Gale et al. |
| 2011/0122024 A1 | 5/2011 | Eidloth et al. |
| 2011/0142150 A1 | 6/2011 | Anigstein et al. |
| 2011/0182230 A1 | 7/2011 | Ohm et al. |
| 2011/0286325 A1 | 11/2011 | Jalali et al. |
| 2011/0286372 A1 | 11/2011 | Taghavi et al. |
| 2012/0052828 A1 | 3/2012 | Kamel et al. |
| 2012/0150364 A1 | 6/2012 | Tillotson et al. |
| 2012/0202430 A1 | 8/2012 | Jalali et al. |
| 2012/0235863 A1 | 9/2012 | Erdos et al. |
| 2013/0040655 A1 | 2/2013 | Keidar |
| 2013/0070677 A1 | 3/2013 | Chang |
| 2013/0109299 A1 | 5/2013 | Roos et al. |
| 2013/0148570 A1 | 6/2013 | Miller et al. |
| 2013/0155847 A1 | 6/2013 | Li et al. |
| 2013/0156021 A1 | 6/2013 | Ashikhmin et al. |
| 2013/0303080 A1 | 11/2013 | Moreno |
| 2013/0321204 A1 | 12/2013 | Zahavi et al. |
| 2013/0331026 A1 | 12/2013 | O'Neill et al. |
| 2014/0003302 A1 | 1/2014 | Han et al. |
| 2014/0003394 A1 | 1/2014 | Rubin et al. |
| 2014/0049643 A1 | 2/2014 | Segerstrom et al. |
| 2014/0073337 A1 | 3/2014 | Hong et al. |
| 2014/0105054 A1 | 4/2014 | Sägrov et al. |
| 2014/0139372 A1 | 5/2014 | Seol et al. |
| 2014/0241239 A1 | 8/2014 | Chang |
| 2014/0335817 A1 | 11/2014 | Hyde et al. |
| 2014/0347223 A1 | 11/2014 | Hyde et al. |
| 2014/0348140 A1 | 11/2014 | Atkinson |
| 2015/0142966 A1 | 5/2015 | Baran et al. |
| 2015/0236778 A1 | 8/2015 | Jalali |
| 2015/0236779 A1 | 8/2015 | Jalali |
| 2015/0236780 A1 | 8/2015 | Jalali |
| 2015/0236781 A1 | 8/2015 | Jalali |
| 2015/0237569 A1 | 8/2015 | Jalali |
| 2015/0280812 A1 | 10/2015 | Jalali |
| 2015/0301529 A1 | 10/2015 | Pillai et al. |
| 2015/0304885 A1 | 10/2015 | Jalali |
| 2015/0362917 A1 | 12/2015 | Wang et al. |
| 2016/0013858 A1 | 1/2016 | Jalali et al. |
| 2016/0088498 A1 | 3/2016 | Sharawi |
| 2016/0112116 A1 | 4/2016 | Jalali et al. |
| 2016/0134358 A1 | 5/2016 | Jalali et al. |
| 2016/0337027 A1 | 11/2016 | Jalali |
| 2017/0156097 A1 | 6/2017 | Weber et al. |

FOREIGN PATENT DOCUMENTS

| | | |
|---|---|---|
| EP | 2801838 A1 | 11/2014 |
| JP | S6141979 A | 2/1986 |
| WO | WO-2014007873 A2 | 1/2014 |

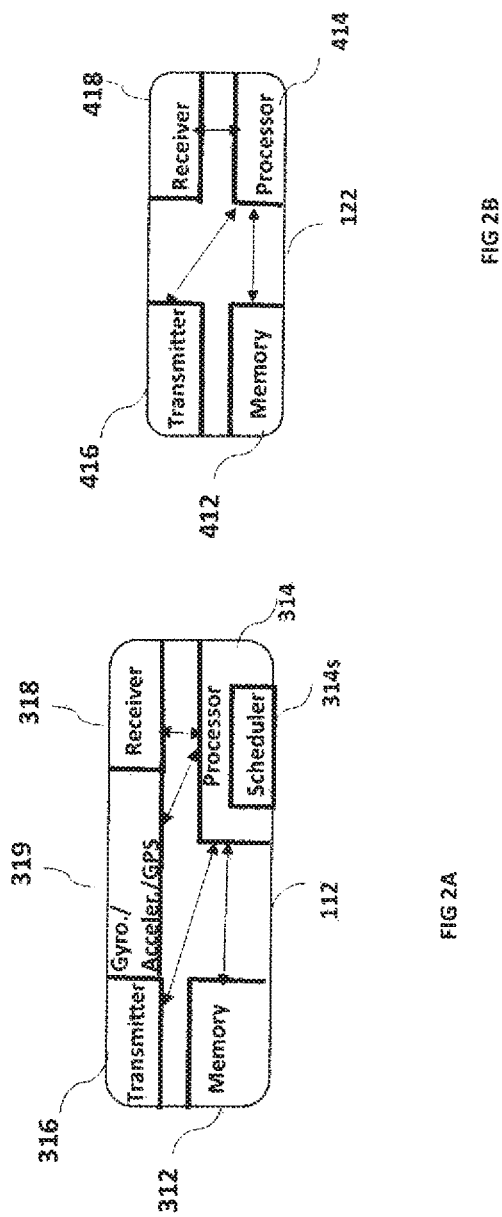

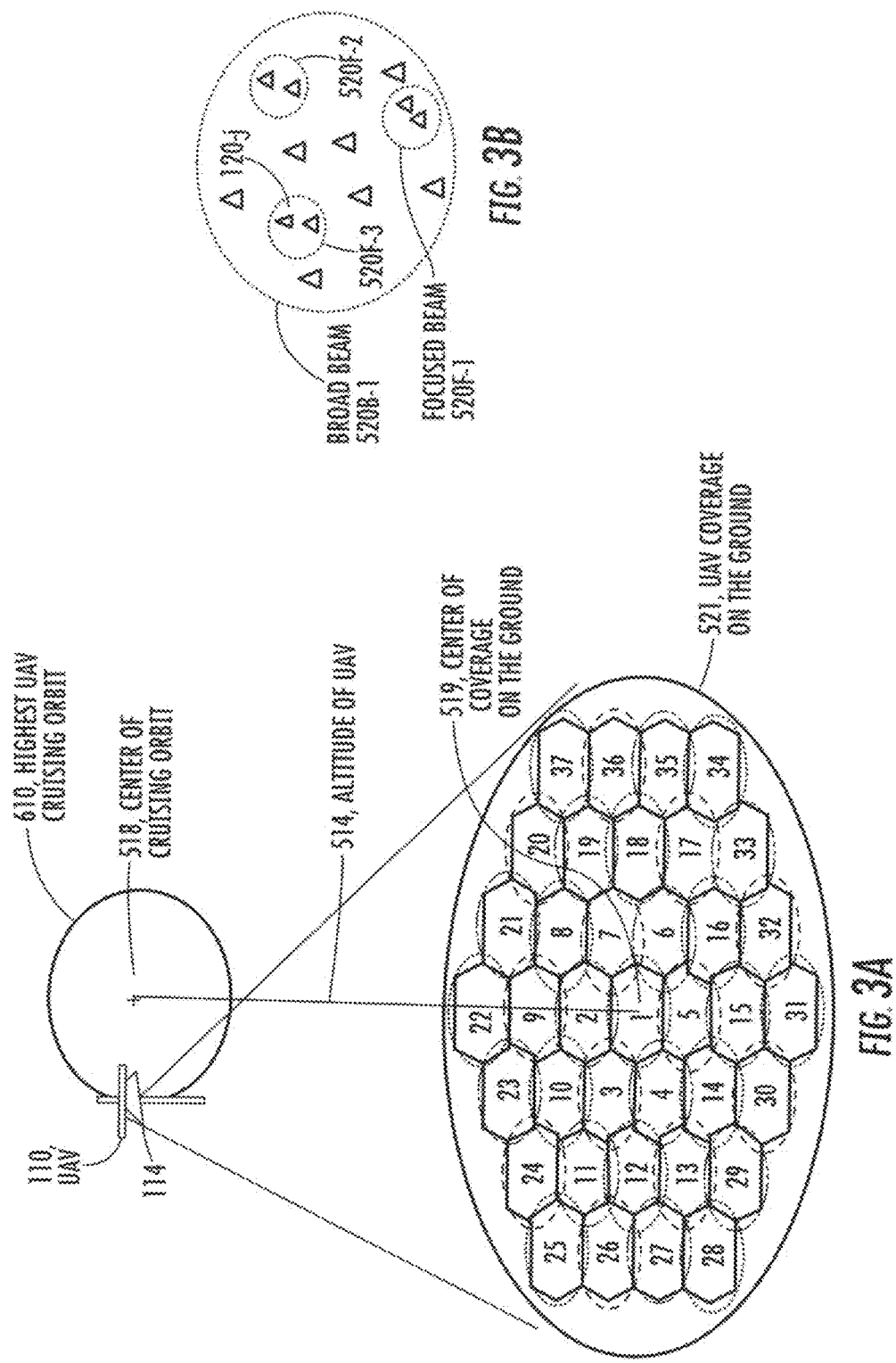

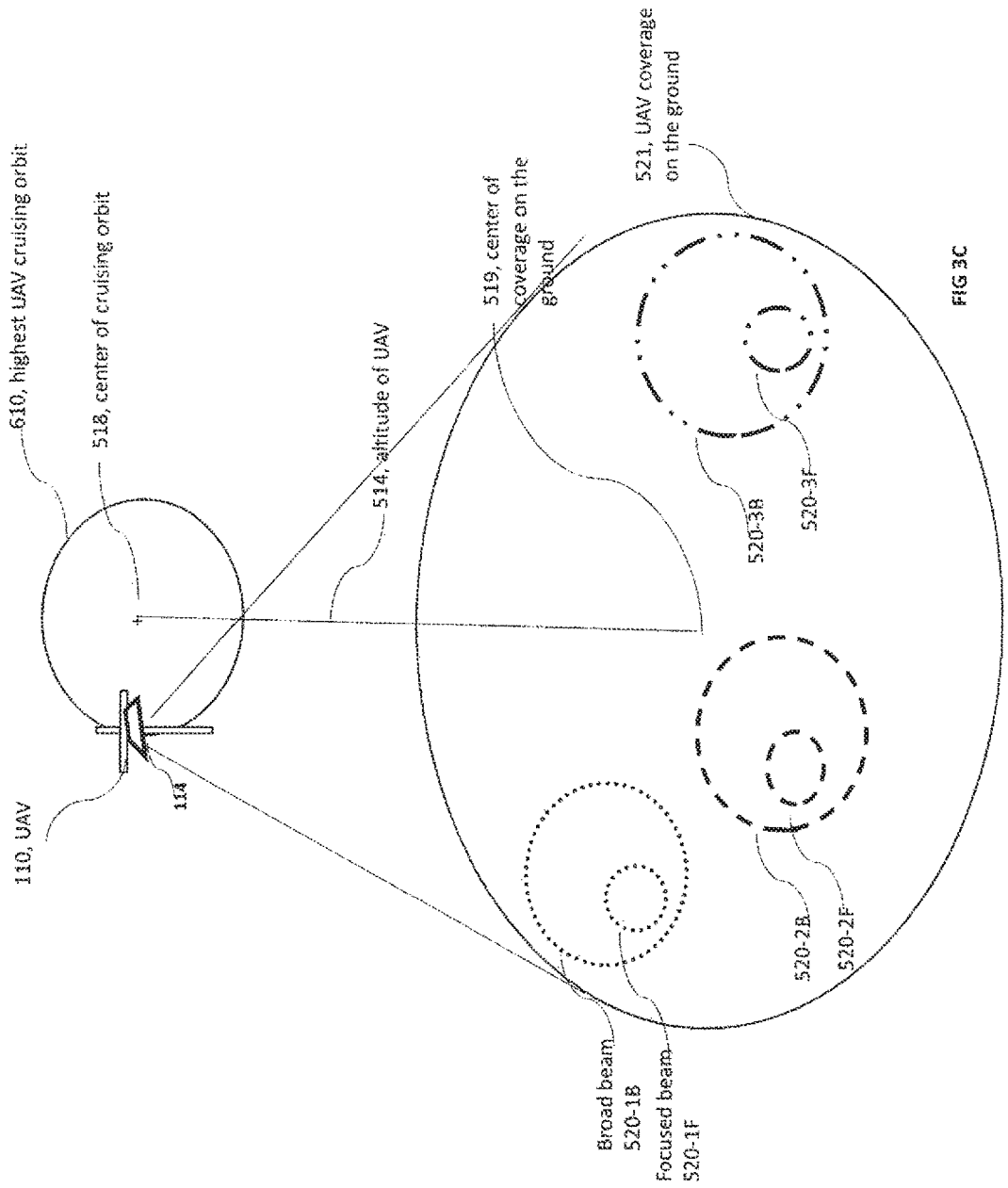

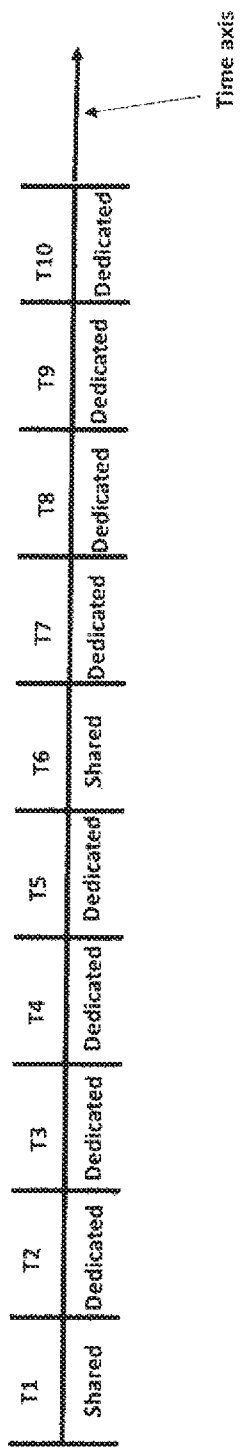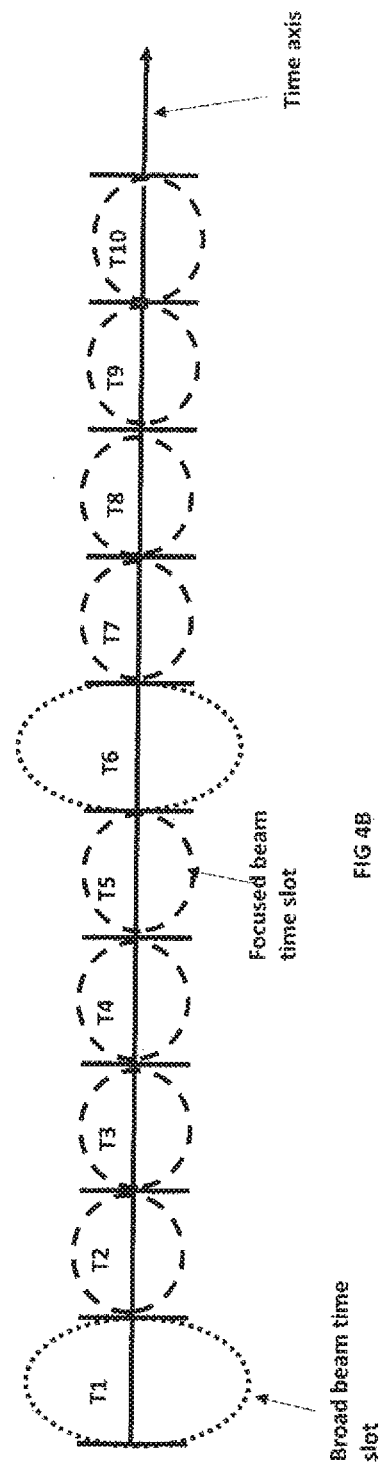
FIG 4A
FIG 4B

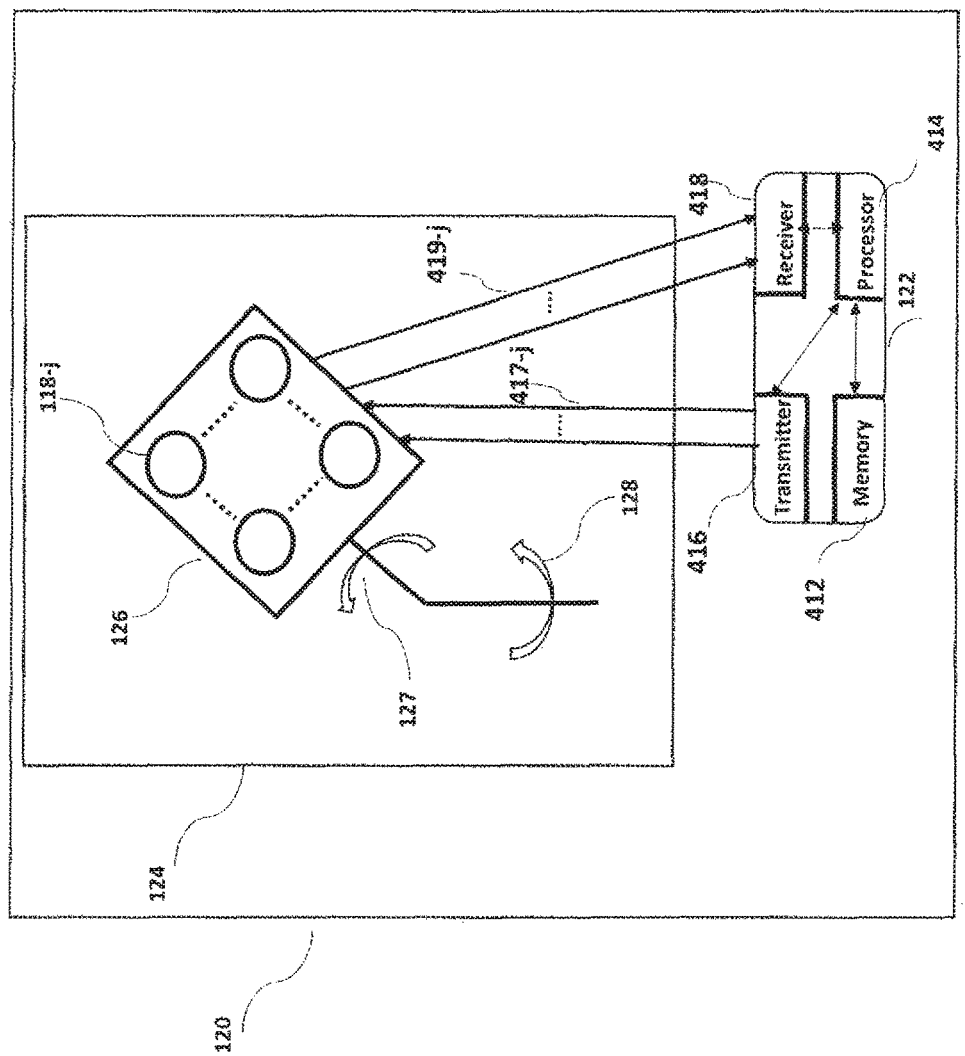

UNMANNED AERIAL VEHICLE (UAV) BEAM POINTING AND DATA RATE OPTIMIZATION FOR HIGH THROUGHPUT BROADBAND ACCESS

PRIORITY

This application claims the benefit of priority to co-owned U.S. Provisional Patent Application Ser. No. 62/333,088, entitled "UNMANNED AERIAL VEHICLE (UAV) MULTI-LAYER BEAM POINTING AND SCHEDULING TOWARD GROUND TERMINALS FOR BROADBAND ACCESS", filed May 6, 2016, which is incorporated herein by reference in its entirety.

RELATED APPLICATIONS

This application is related to co-owned, U.S. patent application Ser. No. 15/225,256, entitled "UNMANNED AERIAL VEHICLE (UAV) BEAM POINTING AND DATA RATE OPTIMIZATION FOR HIGH THROUGHPUT BROADBAND ACCESS", filed contemporaneously herewith, co-owned, U.S. patent application Ser. No. 15/225,269, entitled "UNMANNED AERIAL VEHICLE (UAV) BEAM POINTING AND DATA RATE OPTIMIZATION FOR HIGH THROUGHPUT BROADBAND ACCESS", filed contemporaneously herewith, co-owned, co-pending U.S. patent application Ser. No. 14/711,427, entitled "GROUND TERMINAL AND GATEWAY BEAM POINTING TOWARD AN UNMANNED AERIAL VEHICLE (UAV) FOR NETWORK ACCESS", filed on May 13, 2015, co-owned, U.S. patent application Ser. No. 14/626,698, entitled "BEAM FORMING AND POINTING IN A NETWORK OF UNMANNED AERIAL VEHICLES (UAVS) FOR BROADBAND ACCESS", filed on Feb. 19, 2015, co-owned, U.S. patent application Ser. No. 14/516,491, entitled "UNMANNED AERIAL VEHICLE (UAV) BEAM FORMING AND POINTING TOWARD GROUND COVERAGE AREA CELLS FOR BROADBAND ACCESS", filed on Oct. 16, 2014, co-owned, U.S. patent application Ser. No. 14/486,916, entitled "ANTENNA BEAM MANAGEMENT AND GATEWAY DESIGN FOR BROADBAND ACCESS USING UNMANNED AERIAL VEHICLE (UAV) PLATFORMS", filed on Sep. 15, 2014, co-owned, U.S. patent application Ser. No. 14/295,160, entitled "METHODS AND APPARATUS FOR MITIGATING FADING IN A BROADBAND ACCESS SYSTEM USING DRONE/UAV PLATFORMS", filed on Jun. 3, 2014, co-owned, U.S. patent application Ser. No. 14/222,497, entitled "BROADBAND ACCESS TO MOBILE PLATFORMS USING DRONE/UAV", filed on Mar. 21, 2014, and co-owned, U.S. patent application Ser. No. 14/223,705, entitled "BROADBAND ACCESS SYSTEM VIA DRONE/UAV", filed on Mar. 24, 2014, each of the foregoing incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure describes aspects of a system for broadband internet access using unmanned aerial vehicles (UAVs) to relay internet traffic among different types of terminals. The present disclosure describes systems and methods for "optimally" communicating with ground terminals by manipulating coverage area, transmit power, scheduling, etc.

2. Description of Related Technology

As internet traffic has increased, new technologies are needed to deliver broadband access to homes and enterprises at lower cost and to places that are not yet covered. Examples of current broadband delivery systems include terrestrial wired networks such as DSL (Digital Subscriber Line) on twisted pair, fiber delivery systems such as FiOS (Fiber Optic Service), and geo-stationary satellite systems. The current broadband access systems have a number of short comings. One issue is that there is a lack of service provided to remote and/or lightly populated areas. Geo-stationary satellites do provide service in remote areas of the developed world such as the United States. However, poorer areas of the world lack adequate satellite capacity.

A notable reason satellite capacity has not been adequately provided in poorer regions of the world is the relatively high cost of satellite systems. Due to adverse atmospheric effects in satellite orbits, satellite hardware must be space qualified and is costly. Launch vehicles to put the satellites in orbit are also costly. Moreover, due to the launch risk and the high cost of satellites, there may be significant insurance costs for the satellite and the launch. Therefore, broadband satellite systems and services are relatively costly and difficult to justify, particularly in poorer regions of the world. It is also costly to deploy terrestrial systems such as fiber or microwave links in lightly populated regions. The small density of subscribers does not justify the deployment cost.

Hence what are needed are improved methods and apparatus for providing broadband access to consumers. Ideally such methods and apparatus would rely on an inexpensive technology which avoids costs associated with launching and maintaining satellites.

SUMMARY

The present disclosure describes, inter alia, systems and methods for optimally communicating with ground terminals by manipulating coverage area, transmit power, scheduling, etc.

In a first aspect, an unmanned aerial vehicle (UAV) apparatus is disclosed. In one exemplary embodiment, the UAV apparatus includes: an antenna system having at least one antenna aperture configured to form at least one beam toward a location; the at least one antenna aperture configured to form a broad beam to cover a first area, and a smaller focused beam covering a smaller area within the first area; a set of radio transmitters and receivers configured to transmit and receive signals to a set of ground terminals within the at least one target coverage cell; wherein the transmission and reception of signals can be switched between the broad beam and the smaller focused beam; a processor sub-system. In one exemplary embodiment, the UAV apparatus further includes logic configured to generate the at least one beam that covers the at least one target coverage cell; and wherein the at least one beam encompasses at least one ground terminal of the set of ground terminals.

In one variant, the UAV apparatus includes a scheduler configured to determine one or more pointing angles of the smaller focused beam based at least in part on cross-beam interference. In one such variant, the one or more instructions are further configured to cause the UAV apparatus to point the smaller focused beam at a position coordinate of the at least one ground terminal. In some cases, the one or more instructions are further configured to cause the UAV apparatus to: measure one or more Round Trip Delay (RTD) measurements with the at least one ground terminal at multiple UAV locations within a UAV apparatus' cruising orbit; convert the one or more RTD measurements to distance measurements between the UAV apparatus and the at least one ground terminal; and estimate the position coordinate of the at least one ground terminal based on the distance measurements and a corresponding one of the multiple UAV locations corresponding to ones of the distance measurements.

In another variant, the at least one antenna aperture is further configured to form a second smaller focused beam covering a second smaller area within the first area; and wherein a same frequency is used for the smaller focused beam and the second smaller focused beam.

In a third variant, an available bandwidth on an uplink path and a downlink path is divided into a plurality of time slots; and the UAV apparatus further includes a scheduler to assign at least one time slot of the plurality of the time slots for simultaneous use by multiple ground terminals of the set of ground terminals, and at least one time slot for exclusive use by one ground terminal of the set of ground terminals; and the scheduler assigns the at least one simultaneous use time slot to broad beams and the at least one exclusive use time slot to the focused beams.

In a fourth variant, at least one beam is fixed with respect to the UAV apparatus; and the at least one ground terminal is configured to request handoff based at least in part on a first signal quality metric of the at least one beam and a second signal quality metric associated with another UAV apparatus.

In a second aspect, a ground terminal apparatus is disclosed. In one embodiment, the ground terminal apparatus includes: an antenna system having at least one antenna aperture configured to form at least one beam toward the UAV; a radio transmitter configured to transmit uplink signals to the UAV via the at least one beam; a radio receiver configured to receive downlink signals from the UAV via the at least one beam; a processor sub-system. In one exemplary embodiment, the ground terminal apparatus further includes logic that is configured to cause the ground terminal apparatus to: steer the at least one beam to track a location coordinate associated with the UAV.

In one variant, the antenna system further includes: at least one axis mechanical steering mechanism; and the at least one antenna aperture includes a number of sub-apertures.

In a second variant, the at least one axis mechanical steering mechanism uses UAV position location coordinates to mechanically point the at least one antenna aperture toward the UAV. In one such case, the radio receiver is further configured to modify a downlink signal with a gain and a phase adjustment; the radio receiver is further configured to form a received beam based on the modified downlink signal. In some such variants, the radio transmitter is further configured to: weight an uplink signal for each one of the number of sub-apertures by a second gain and a second phase adjustment corresponding to the gain and the phase adjustment for the respective ones of the number of sub-apertures; adjust the weighted uplink signal by a third gain and a third phase adjustment selected to compensate for a hardware gain and a phase difference between a transmit and a receive path for each one of the number of sub-apertures; and transmit the adjusted weighted uplink signal via each one of the number of sub-apertures. In another such variant, an uplink signal is sent via only one antenna sub-aperture at an amplified gain selected to compensate for an attenuation of the only one antenna sub-aperture.

In a third variant, the at least one antenna aperture includes dish antennas.

In a third aspect, a method of forming antenna beams toward at least one target coverage cell is disclosed. In one embodiment, the method includes: scheduling a first plurality of broad beam transmissions covering a first area during at least a first time slot of a plurality of time slots; scheduling a second plurality of focused beam transmissions covering a smaller area within the first area during at least a second time slot of the plurality of time slots. In one exemplary embodiment, for each time slot of the plurality of time slots the method further includes: generating at least one beam that covers the at least one target coverage cell; where the at least one beam encompasses at least one ground terminal of a set of ground terminals within the at least one target coverage cell.

In one variant, the scheduling of the second plurality of focused beam transmissions is based at least in part on cross-beam interference measurements.

In a second variant, the scheduling of the second plurality of focused beam transmissions is based at least in part on dedicated bandwidth requirements.

In a third variant, the scheduling of the first plurality of broad beam transmissions is based at least in part on shared bandwidth requirements.

In a fourth variant, the generating the at least one beam includes generating multiple beams that collectively comprise different frequencies for one or more co-active cells.

In a fifth variant, the generating the at least one beam includes generating multiple beams at a same frequency for one or more co-active cells.

In yet another aspect, a communications system configured to form at least one beam toward a location is disclosed. In one embodiment, the communications systems forms a broad beam covering a large area, and a smaller focused beam covering a smaller area within the large area. In another embodiment, the communications systems forms the at least one beam in accordance with a coverage area, a transmission and reception schedule, and/or one or more frequency allocations. Various embodiments thereof may attempt to maximize or minimize various system parameters, including without limitation, service, power consumption, and/or interference.

In yet another aspect, a communications system configured to form at least one beam toward a location is disclosed. In one embodiment, the communications system is configured to generate at least one beam that covers the at least one target coverage cell; and the at least one beam encompasses at least one ground terminal of the set of ground terminals. Various embodiments may additionally be directed to schemes for selectively managing coverage area, transmission and reception scheduling, and frequency usage.

These and other aspects shall become apparent when considered in light of the disclosure provided herein.

BRIEF DESCRIPTION OF THE DRAWINGS

In the following figures, where appropriate, similar components are identified using the same reference label. Multiple instances of the same component in a figure are distinguished by inserting a dash after the reference label and adding a second reference label.

FIG. 2A is a graphical depiction of exemplary radio equipment of an aerial platform useful in conjunction with various embodiments described herein.

FIG. 2B is a graphical depiction of exemplary radio equipment of a ground terminal useful in conjunction with various embodiments described herein.

FIG. 3A is a graphical depiction of an exemplary aerial platform/unmanned aerial vehicle (UAV) at a given altitude and a network of contiguous beams formed over the coverage area on the ground, in accordance with at least one embodiment described herein.

FIG. 3B is a graphical depiction of a beam structure formed over the coverage area on the ground, that includes: a broad beam covering a cell coverage area and focused beams with smaller coverage areas, in accordance with at least one embodiment described herein.

FIG. 3C is a graphical depiction of an exemplary aerial platform/unmanned aerial vehicle (UAV) at a given altitude and a set of beams formed over the coverage area on the ground, in accordance with at least one embodiment described herein.

FIG. 4A is a graphical depiction of data transmission time slots, useful in conjunction with the various principles described herein.

FIG. 4B is a graphical depiction of exemplary data transmission time slots and a UAV beam type being used during each time slot according to one embodiment of the present disclosure.

FIG. 7 is a graphical depiction of a ground terminal with mechanically steered antenna composed of multiple antenna apertures useful in conjunction with the various principles described herein.

All Figures © Copyright 2016 Ubiqomm, LLC. All rights reserved.

DETAILED DESCRIPTION

This disclosure describes aspects of a system designed to provide broadband access. As used herein, the terms "unmanned aerial vehicle" (UAV), "aerial platform", "drone", refer generally and without limitation to: drones, unmanned aerial vehicle (UAV), balloons, blimps, airships, non-geostationary satellite orbit (NGSO) satellite systems such as Low Earth Orbit (LEO) satellites, etc. The aerial platforms may include propulsion systems, fuel systems, and onboard navigational and control systems. In one exemplary embodiment, the aerial platform includes a fixed wing fuselage in combination with a propeller, etc. In other embodiments, the aerial platform includes a robocopter, propelled by a rotor. The aerial platform may carry fuel onboard or function using solar energy.

Figure 1:
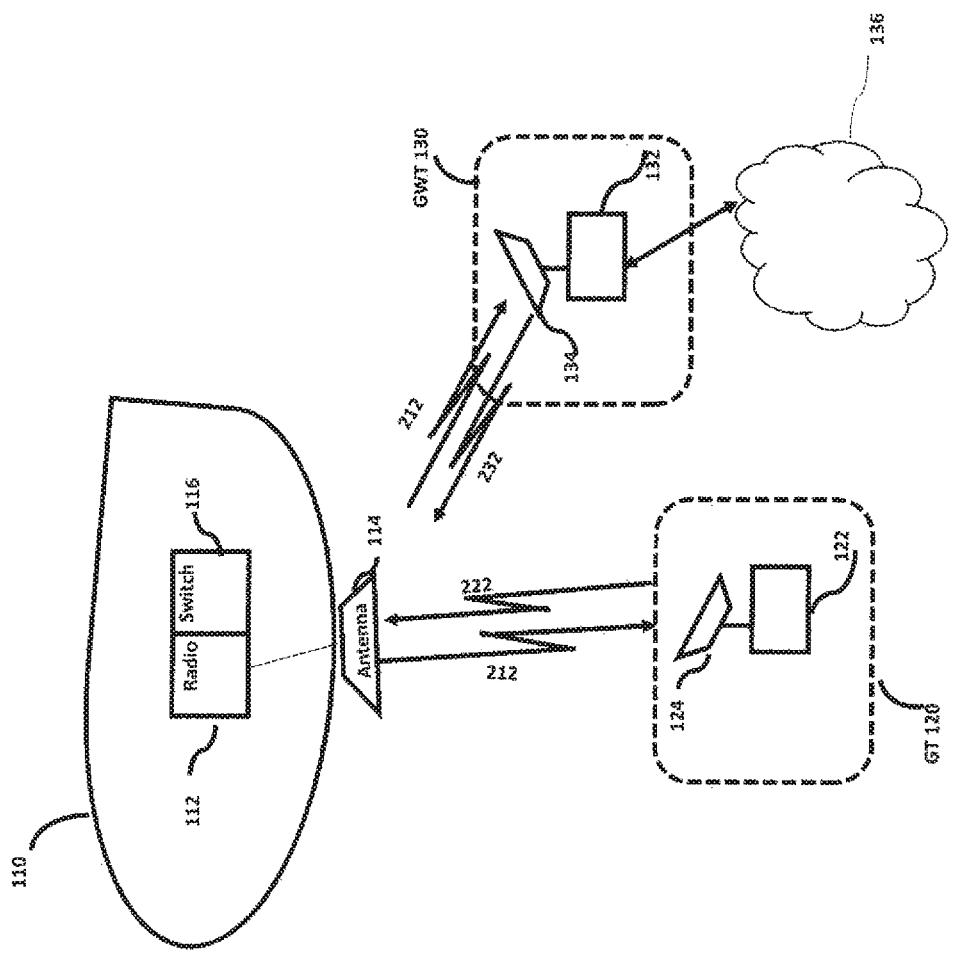
FIG. 1 is a graphical depiction of an exemplary aerial platform based communications system useful in conjunction with various embodiments described herein.

FIG. 1 shows one exemplary embodiment of an unmanned aerial vehicle (UAV) 110. As shown, the exemplary UAV 110 has a drone radio sub-system 112, a message switch sub-system 116, and at least one drone antenna aperture sub-system 114. UAVs communicate with at least two types of ground terminals: one type of terminals are so-called user Ground Terminals (GT) 120, such as terminals at home or enterprises to provide internet connectivity to home or enterprise (such as e.g., the Internet); a second type of terminal is referred to as an Internet Gateway (GTW) 130 which is connected to the Internet. The embodiments described hereinafter apply to fixed terminals/devices on the ground, as well as mobile terminals/devices attached to platforms such as vehicles, boats, ship, airplanes, trucks, etc., and standalone mobile devices (e.g., handheld devices, etc.). The term "device", as used hereinafter may broadly encompass any of the aforementioned platforms (e.g., the drone 110, the GT 120, and/or the GTW 130). During operation, the UAV is configured to cruise or patrol an "orbit", and provide connectivity between the ground terminal (GT) 120 and other GT 120 and/or gateway terminals (GTW) 130. The GTWs 130 may be connected to broader internet networks 136, thereby providing the GT 120 internet access and/or access to other GT or GTW.

FIG. 2A illustrates one exemplary embodiment of an unmanned aerial vehicle (UAV) radio sub-system 112 that includes five (5) sub-systems: a receiver 318 that is configured to demodulate and decode a signal received from a drone antenna aperture sub-system 114; a transmitter 316 that is configured to modulate data received from a processor 314 and send the resulting signal through the drone antenna aperture sub-system 114; a processor sub-system 314 that is configured to carry out functions such as: (i) configuring the receiver 318 and transmitter 316 sub-systems, (ii) processing the data received from the receiver 318 sub-system, (iii) determining the data to be transmitted through the transmitter sub-system 316, and (iv) controlling the antenna sub-system 114; a non-transitory computer readable memory sub-system 312 that is configured to store one or more program code instructions, data, and/or configurations, and system parameter information that are accessed by the processor 314; and a gyroscope/accelerometer/Global Positioning System (GPS) sub-system 319 that is configured to determine a position and orientation of the UAV such as roll/pitch angles. FIG. 2A also shows a scheduler sub-system 314s which is a part of the processor 314. Scheduler 314s has two main functions: (i) assigning communications bandwidth to different terminals 120 to send/receive data to/from internet; and (ii) determining which simultaneous beams may be formed during a communications time unit (e.g., a time slot) toward different locations on the ground while maintaining the cross-beam interference among the beams below a certain threshold.

Depending on the altitude of the UAV, each UAV covers an area on the ground with a radius of as low as a few 10s of kilometers (km) and as much as 200 km or more. GTs 120 transmit and receive data from the internet using the UAV 110 as intermediary to the GTW 130. The UAV's radio sub-system aggregates traffic received from the GTs within the coverage area of the UAV of a population of GTs (in some implementations the UAV may aggregate traffic from as many as all GTs and as few as one GT) and sends the aggregated data to the internet via one or more of the GTWs. Since, the GTWs handle aggregated data from multiple GTs, practical implementations of the present disclosure may support higher data rates between the UAV and the GTW, than between the UAV and the GT. Accordingly, in one embodiment the gain of the GTW antenna sub-system is much larger than that of the GT, and the GTW transmitter transmits at higher power than the GTs. Those of ordinary skill in the related arts will readily appreciate the wide variety of techniques which may be used to increase gain, including without limitation, increasing transmit/receive power, increasing bandwidth, increasing processing gain, increasing coding gain, etc.

Referring back to FIG. 1, the GT 120 has two (2) main sub-systems, a ground terminal radio sub-system 122, and a ground terminal antenna sub-system 124. As shown in FIG. 2B, the GT radio sub-system 122 includes four (4) sub-systems: the receiver 418 that demodulates and decodes the signal from the drone antenna sub-system; the transmitter sub-system 416 that modulates the data and sends the resulting signal through the antenna sub-system 124; the processor sub-system 414 that carries out functions such as: configuring the receiver 418 and transmitter 416 sub-systems, processing the data received from the receiver 418 sub-system, determining the data to be transmitted through the transmitter sub-system 416, as well as controlling the antenna sub-system 124; and the memory sub-system 412 that contains program code, configuration data, and system parameters information that are accessed by the processor 414.

The desired target coverage area on the ground is divided into a number of cells; one such exemplary division is shown as an arrangement of thirty seven (37) hexagonal cells in FIG. 3A. The UAV platform forms beams to cover each cell on the ground in its target coverage area. As shown, the UAV generates thirty seven (37) beams corresponding to the hexagonal cells; e.g., one (1) "central beam" and three (3) rings of beams around the central beam, on the ground. Hexagons are used to show the ideal coverage of each beam, however in reality, the beams overlap as shown by the dashed circles. In this exemplary example, the available frequency bandwidth is divided into three (3) bands (F1, F2 and F3), and the three (3) frequency bands are assigned to adjacent beams in such a way that no two neighboring beams use the same frequency. The three types of beams (as represented by a dotted type of circle and two (2) types of dashed circles) may represent beams that use three (3) different frequency channels to minimize inter-beam interference. The foregoing frequency allocation scheme is described as having a "frequency reuse" of three (3). The three (3) different circle types indicate beams that use different frequency bands. Moreover, as described in greater detail hereinafter, some embodiments of the UAV and terminal antenna systems (e.g., 114 and 124 in FIG. 1) can be further modified to use different polarizations. For example, by using dual circular polarizations, two data streams can each be distinctly assigned different antenna polarization (e.g., clockwise and counter-clockwise), thereby doubling the system throughput. Those of ordinary skill in the related arts, given the contents of the present disclosure, will readily appreciate that other frequency reuse schemes and/or cell divisions may be interchangeably used with equal success.

Aerial platforms (such as UAVs) cruise/patrol in a three dimensional (3D) space (e.g., latitude, longitude, and altitude). The position of the aerial platform/UAV with respect to the terminals on the ground changes as the aerial platform/UAV moves horizontally and vertically within its cruising orbit (e.g., a circle, figure eight, clover leaf, etc.).

The beams depicted in FIG. 3A may be fixed on the ground using a UAV 110 antenna system 114 capable of dynamically moving the beams such as to keep the beam fixed on the ground as the UAV travels in its orbit, or the beams may be fixed with respect to the UAV 110 in which case the beams will move on the ground as the UAV travel in its cruising orbit. The beam network of FIG. 3A shows only one beam size (circles) covering a hexagonal cell on the ground where a large number of ground terminals are located. Artisans of ordinary skill in the related arts will readily appreciate that circles are conceptual depictions of the actual beams that are formed by the UAV antenna sub-system to cover different cell areas on the ground; actual coverage may vary depending on a variety of factors including but not limited to obstacles, reflections, weather conditions, UAV positioning (pitch, yaw, roll), etc.

One benefit of using a single beam to cover a large number of terminals is that the terminals may continuously monitor the beam that covers the area where the terminal is located, and point the terminals beam toward the UAV based on signal strength measurements made on signals received from the UAV. This feature can be used to efficiently send/receive short burst of data traffic to/from the UAV. However, single beam embodiments are not always desirable; thus multi-beam embodiments may be used, as is described in greater detail herein.

Figure 4C:
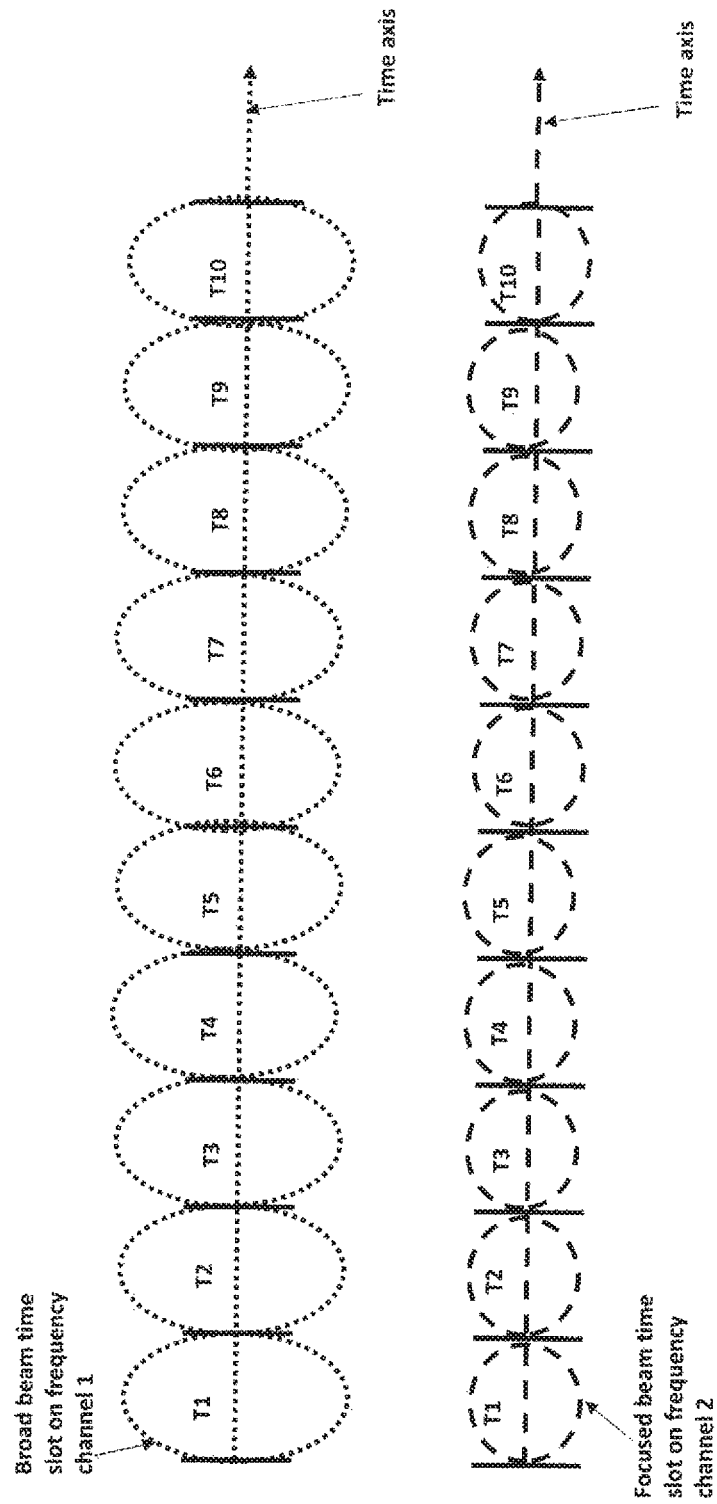
FIG. 4C is a graphical depiction of exemplary data transmission time slots on two different frequency channels and a corresponding UAV beam type used during the time slots of each frequency channel according to one embodiment of the present disclosure.

FIG. 4A is an exemplary depiction of how the available channel bandwidth is divided into time slots, where time slots T1 through T10 are shown. In one such embodiment, there are two (2) types of time slots defined: shared time slots (time slots T1 and T6 in FIG. 4A); and dedicated time slots (time slots T2 through T5, and T7 through T10). The different types of time slots, shared and dedicated, may also be referred to as shared and dedicated channels in the sequel. Shared time slots, as the name implies, are shared by a number of terminals. Dedicated channels are assigned to specific terminals one at a time. Generally, "shared" usage allows for flexible resource use based on resource arbitration and/or access schemes (e.g., code division multiple access, Aloha/slotted Aloha, carrier sense multiple access, etc.) In contrast, "dedicated" usage allocates resources in a fixed manner by a centralized resource management entity (obviating network overhead for resource arbitration.)

In some embodiments, the time slot division and designation of FIG. 4A applies to both uplink and downlink directions between the UAV and the terminal. In other embodiments, the time slot divisions and/or designations between uplink and downlink directions may be asymmetrically allocated. During a shared time slot, the entire bandwidth is shared among the terminals in a given cell coverage area covered by the broad beam. In some such variants, the available channel frequency bandwidth may be divided into smaller frequency channels, and each of the constituent frequency channels may be shared among a certain number of terminals. Similarly, during a dedicated time slot the available frequency bandwidth may be divided into a number of smaller frequency channels, and each of the constituent frequency channels may be assigned to different terminals in a beam's coverage area, or the entire bandwidth may be assigned to one terminal.

Various embodiments of the present disclosure may use fixed resource allocations or dynamically change resource allocations based on usage considerations. For example, when a ground terminal has data to send to the UAV, it can either send the data on a shared uplink time slot to the UAV, or the ground terminal can use an uplink shared time slot to request a bandwidth allocation for an uplink dedicated time slot to send its data. Artisans of ordinary skill in the related arts will readily appreciate that the overhead needed for a terminal to request bandwidth, and for the UAV to assign the bandwidth to the terminal, is inefficient unless there is a large enough burst of data to be sent. Thus, it may be more efficient to send data on a shared uplink data channel for signaling messages between the terminal and the UAV and/or for short bursts of data packets generated by the terminals or the internet. Moreover, when the terminal is joining the system after power up or has been idle for a time period, the terminal only needs to send relatively short signaling messages (which can be efficiently sent on a shared channel) to e.g., register with the system, or to inform the UAV radio sub-system 112 that the terminal intends to start a session. But when the terminal has a relatively large amount of data to send, it is more efficient to allocate a certain amount of bandwidth to the terminal on a dedicated uplink data channel. Similarly, in the downlink direction, the UAV may aggregate signal messages and short bursts of data destined to different terminals in a shared downlink channel in order to improve the bandwidth efficiency of the system; aggregating data for the downlink channel avoids/minimizes partially filled physical layer frames, and also reduces delay. When the UAV has accumulated enough data to send to a terminal, it may then allocate bandwidth to the terminal on a dedicated downlink channel. In some cases, the terminal may consider a variety of factors including e.g.: the amount of accumulated data, delivery time requirements for the accumulated data, elapsed accumulation time, network congestion, etc.

Example Operation

While the foregoing descriptions provide a generalized framework for optimizing network coverage via one or more UAVs, various aspects of the present disclosure are directed to further improvements for UAV coverage based on intelligent management of beam interference by manipulating coverage area, transmit power, scheduling, etc. More directly, the following discussions provide interference mitigation strategies which may be used either alone or in combination to e.g., maximize coverage area and data throughput/latency, while also minimizing power consumption and interference.

Dynamic Multi-Layer Beam Pointing—

In a first aspect of the present disclosure, the UAV dynamically switches between multiple "layers" of coverage area. Broader layers of coverage provide larger coverage areas, but may be limited in data. Focused layers of coverage provide smaller coverage areas that can support higher data rates e.g., for dedicated use. For example, in one embodiment, the uplink and downlink shared channels are transmitted on a beam that is wide enough to cover all terminals in a certain defined cell coverage area. However, since dedicated uplink and downlink channels only service one terminal at a time (or a number of terminals that are in close proximity to one another), the data rate from/to the terminal may be increased by generating a more focused, and therefore higher gain, beam. Accordingly, in one such variant, the UAV generates broad beams that cover the whole cell coverage area when shared channels are transmitted, and generates focused beams with higher gain to service the time dedicated channels; this configuration provides higher throughput and bandwidth efficiency for dedicated use (i.e., when resources are dedicated for specific user(s)).

FIG. 3B depicts one such exemplary beam structure that covers a certain cell area composed of a broad beam 520B-1 covering a cell coverage area, and focused beams 520E-1, 520E-2 and 520E-3 toward terminals 120-j during communications on dedicated channels, where j is an index identifying different terminals of the same type in a smaller coverage area. As shown in FIG. 3B, even within the focused beams there may be a number of terminals. Thus, in some variants, the UAV may use shared time slots to load balance the focused beams when it is beneficial to communicate with multiple terminals within a focused beam's coverage area. FIG. 4B depicts an example where some time slots are transmitted on broad beams, shown by ellipses, and some on focused beams, shown by circles.

FIG. 3C illustrates a UAV broadband access system where the UAV forms a set of non-contiguous beams. In this case, the beams formed by the UAV are fixed on certain locations on the ground for at least the time duration that data is being transferred to/from terminals in the corresponding beam locations, such as beams 520B-1, 520B-2 and 520B-3 of FIG. 3C. The beams may be dynamically moved between locations where there are terminals. As shown in FIG. 3C, there are two (2) types of beams, broad beams denoted by 520B, and focused beams within each broad beam denoted by 520F. In the system of FIG. 3C, the beams are fixed with respect to the ground using antenna techniques with electronic beam steering capability such as phase array antennas. In other implementations, the beams may be fixed with respect to the UAV, or dynamically moved according to some other consideration (e.g., to augment coverage, etc.)

As discussed above, the focused beam is used to increase the antenna gain, and therefore the data rate, when sending/receiving data to/from one or a small ground of terminals that are in close proximity to one another. In order to focus the beam on a small area as shown in FIG. 3B (beams 520E-1, 520E-2, and 520E-3), the UAV determines the position coordinates of the specific terminal or the small area. More directly, in order to maximize the Signal to Interference plus Noise Ratio (SINR) seen by the ground terminals and at the UAV, the UAV scheduler (314s in FIG. 2A) determines the locations to steer focused beams. Various schemes for location determination may be implemented by those of ordinary skill in the related arts, given the contents of the present disclosure. Common examples include e.g., satellite positioning (e.g., Global Positioning System (GPS), gyroscope/accelerometer tracking, triangulation from known beacons, etc.)

So-called "cross-beam" interference occurs when two or more simultaneously focused beams use the same frequency band (also referred to as so-called "co-channel" interference). In one exemplary embodiment, the UAV scheduler further monitors cross-beam interference among the beams, to ensure the interference remains below a certain threshold. For example, the scheduler may ensure that the simultaneous co-frequency focused beams are far enough apart such that the cross-beam interference among the beams is below the acceptable thresholds. Various metrics may be used by the scheduler to determine which focused beams may be formed while not exceeding the cross-beam interference.

For example, one such scheme maintains a minimum distance between centers of the simultaneous co-frequency beams based on a distance metric. Another scheme would be to compute that cross-interference between the multiple candidate simultaneous co-frequency beams, using knowledge of the focused beams' antenna patterns; and to schedule those beams whose cross-interference (based on a cross-interference metric) do not exceed acceptable thresholds. In one such variant, when two simultaneous focused beams are close enough to exceed the cross-beam interference when using the same frequency band (such as under a frequency reuse of one (1) scheme), then the scheduler may assign different frequency bands/channels to the focused beams.

In the exemplary broad beam network shown in FIG. 3A, a frequency reuse factor of three (3) is used for the broad beams in order so as to minimize cross-beam interference. However, in some embodiments, during the time slots when focused beams are formed, the scheduler may (as described above) schedule focused beams that are on the same frequency band (i.e., with a frequency reuse of one (1)) for different time slots, thereby making more efficient use of the spectrum.

Sequential Beam Pointing —

In the foregoing dynamic multi-layer beam pointing embodiments, the focused beams are dynamically allocated to terminals while ensuring that the SINR seen by any terminal remains above a certain threshold. To these ends, the scheduler assigned beams to different terminals to maximize (or minimize) certain performance metrics, such as total throughput from all terminals, or the SINR each terminals receives, etc. In a second aspect of the present disclosure, the UAV minimizes cross-beam interference by sequentially using certain predefined beams/cells in such a way as to minimize interference among beams; for example, to maximize SINR seen by a specific terminal or the UAV radio sub-systems in order to maximize system throughput. In one such variant, the entire coverage area is divided into a number of cells covered by beams, and the scheduler sequentially turns on or off various cells thereof.

In at least one exemplary implementation, the sequence of activating cells is based on a deterministic scheme. Deterministic schemes allow for simpler coordination between the UAV and the ground terminals, thereby reducing unnecessary power consumption (i.e., ground terminals do not need to turn on when there is no active coverage). Common examples of a deterministic schemes include e.g., pseudo-random assignments, fixed sequence assignments, etc.

Figure 5A:
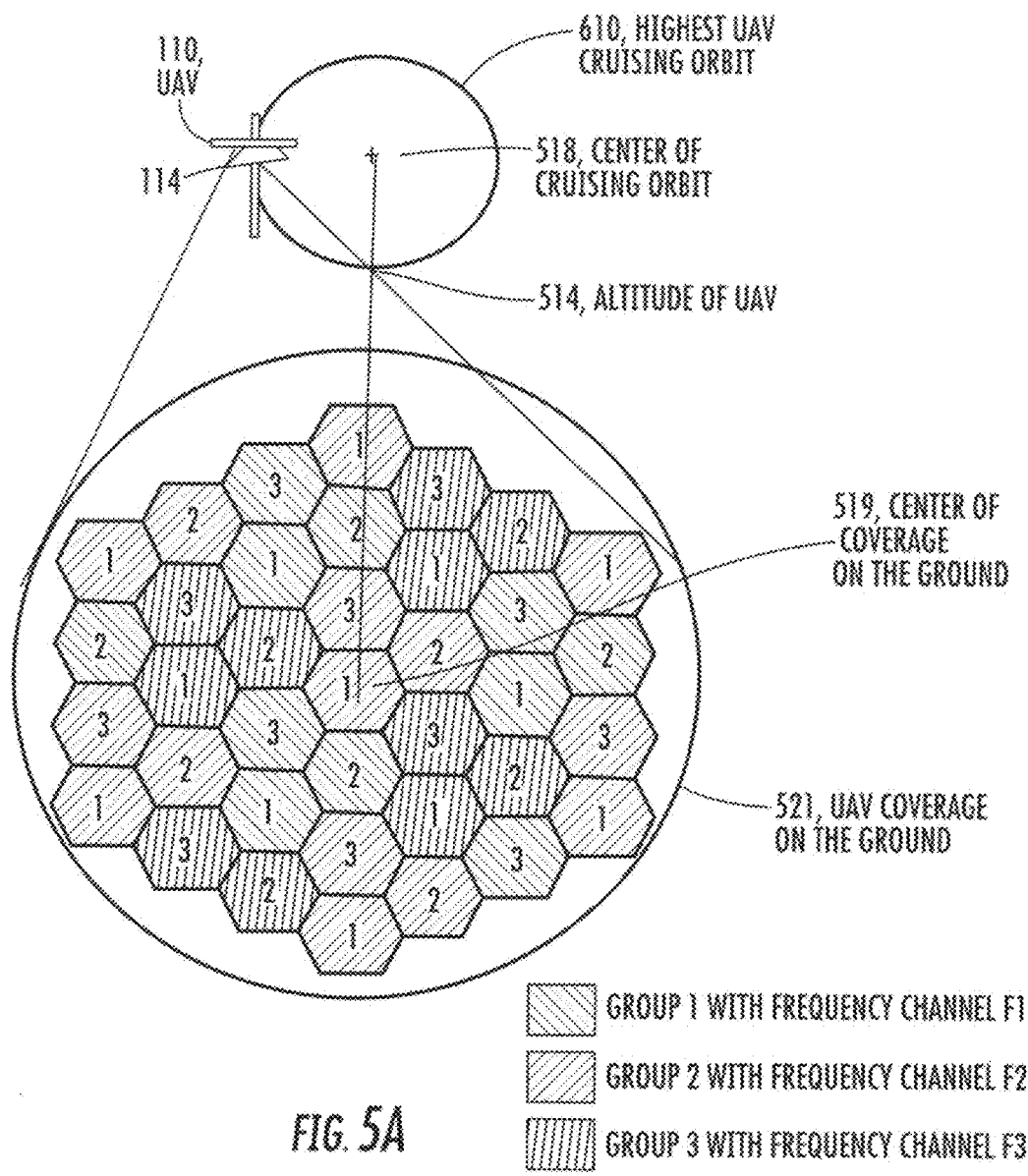
FIG. 5A is a graphical depiction of an exemplary UAV beam forming on coverage cells on the ground.

FIG. 5A shows an exemplary diagram of how an exemplary coverage area on the ground may be divided into different cells covered by beams. As shown, the area is divided into conceptual hexagonal cells which are covered by beams formed by the UAV antenna sub-system. The hexagons are grouped into groups of three (3) as represented by different hash marked fills. Each group is serviced under the same frequency channel. Each of the groups corresponds to a different frequency. In other words, a first group may use a frequency channel F1, a second group uses frequency channel F2, and a third group uses frequency channel F3.

In the system depicted by FIG. 5A, there are three (3) sets of co-active beams 1, 2 and 3. In one such variant, only one of the co-active set of beams may be turned on at a time, while the other sets of co-active beams are off. For example, the UAV radio sub-system first transmits on co-active beams numbered 1, while keeping co-active beams numbered 2 and 3 off. Once the terminals in the cells numbered 1 are served, then the UAV radio sub-system turns co-active beams numbered 1 off, and powers on co-active beams numbered 2 to transmit/receive data to/from terminals in the coverage area of the co-active beams numbered 2. Next, co-active beams numbered 3 are next turned on, while keeping co-active beams numbered 1 and 2 off. The coverage area arrangement and beam scheduling scheme described above reduces co-frequency interference among beams by spatially separating use; more directly, the same frequency is not used in the nearest beams/cells. Deterministic sequential beam pointing allows for high gain spot beams to increase the overall system's gain and throughput. Artisans of ordinary skill in the related arts will readily appreciate that the foregoing discussion is purely illustrative; a greater or fewer number of groups and/or co-active beams may be substituted with equivalent success, given the contents of the present disclosure. Moreover, while the foregoing example is illustrated with only one active set of beams at a time, those of ordinary skill in the related arts will readily appreciate that multiple sets of co-active beams may be on at the same time, so long as the cross-beam interference remains within acceptable levels.

Figure 5B:
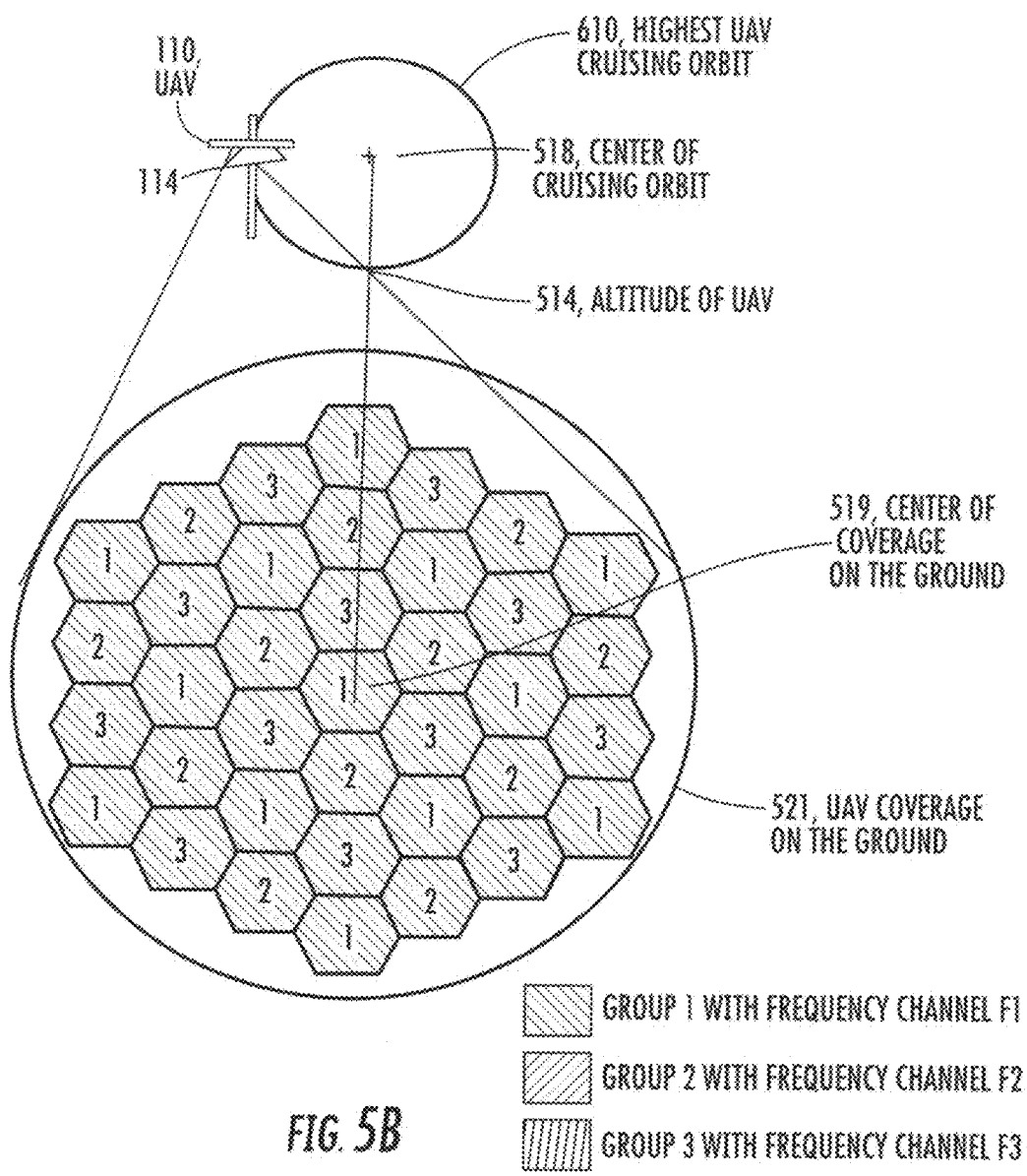
FIG. 5B is a graphical depiction of an exemplary UAV beam forming on coverage cells on the ground.

FIG. 5B illustrates an alternative variant of the UAV beam forming network, where beams covering all cells use the same frequency channel (as distinguished from the different frequency channels in FIG. 5A). As shown, the network of FIG. 5B also divides the coverage area into groups of three (3) co-active cells (also shown numbered 1, 2 and 3). As in the system described in conjunction with FIG. 5A, the UAV forms beams only toward one set of co-active cells at a time. In the system of FIG. 5B, however, unlike the frequency reuse scheme of three (3) in FIG. 5A, the co-active beams of FIG. 5B use the same frequency channel (i.e., frequency reuse of one (1)). A frequency reuse of one (1) makes better use of the available spectrum as it assigns more spectrum to each beam without dividing the available spectrum into smaller channels (e.g., a set of three (3) or more channels). However, a frequency reuse of one (1) can introduce more cross-beam interference if the system is not designed to adequately isolate co-active beams. Consequently, in the system of FIG. 5B, the cross-beam interference is managed by stipulating that the UAV will be transmitting on only a subset of the co-active beam sets at a time. For example, the UAV only transmits on one (1) cell of the co-active cells numbered 1; the other neighboring co-active cells numbered 1 do not receive transmissions thereby reducing cross-beam interference. Notably, the ground receivers located within the co-active cells numbered 1 may or may not be active for the transmit time.

In certain exemplary embodiments, the neighboring beams that belong to different co-active beam groups (e.g., 1, 2 or 3) may be formed by the same antenna aperture. In some such variants, only one of the three (3) neighboring beams are used, the same antenna aperture can move the beam from one cell to another in the three (3) neighboring cells with different co-active cell numbers. In another embodiment, the same antenna aperture may form multiple beams, each beam covering a different co-active cell. Artisans of ordinary skill in the related arts will readily appreciate that increasing/decreasing the number of beams is directly proportional to processing gain and power consumption; thus, some implementations may dynamically enable or disable the number of simultaneous co-active beams, depending on e.g., the UAV's own internal considerations and capabilities, the network's requirements, user requirements, etc.

Artisans of ordinary skill in the related arts will readily appreciate that deterministic schemes are inflexible, and thus can be inefficient where the network traffic is unpredictable and/or where network traffic is prone to spiking. Accordingly, alternative embodiments may use non-deterministic schemes where the UAV determines which cells should be serviced based on e.g., historic and/or known traffic requirements, load balancing, total outage time (so as to ensure that certain cells receive a minimum level of coverage, even where higher priority cells are present), network priority information, etc. Since non-deterministic sequencing is unpredictable, the ground terminal may need to regularly check for coverage status; thus, in some variants, the UAV may additionally provide beacon type information, or possibly other out-of-band information, that allows the ground terminals to minimize power consumption when not being serviced.

In some variants of the systems described above in conjunction with FIGS. 5A and 5B, the UAV beam may cover the whole defined conceptual hexagonal cell, and therefore the same beam provides coverage for shared and dedicated channels. In other words, in the UAV beam network design embodiments described by FIGS. 5A and 5B, the same beam may allow operation of either and/or both shared and dedicated channels over the cell's coverage area during the time a given beam is on and is communicating with the terminals in its cell coverage area.

Beam-Specific Power Control—

While the foregoing examples illustrate intelligent management of coverage area to optimize network efficiency, other aspects of service provision can be adjusted to further improve operation. As a brief aside, network traffic is generally unpredictable and can experience spikes or bursts of activity. In order to maximize network uptime, network infrastructure is generally capable of supporting excess capacity, but only enables those resources when necessary. Accordingly, within the context of the present disclosure, so-called "low traffic" cells have ground terminals that have little or no data to send/receive. In some variants, a cell that has low priority (and/or best effort delivery) traffic may also be considered a low traffic cell.

During normal operation, some cells may have low traffic periods. For example, consider the systems where a co-active group of cells includes at least one or more low traffic cells. If power is equally allocated to each cell of the co-active group of cells then the powers allocated by the UAV to the beams associated with the low traffic cells are more than adequate to support their low data rates; in contrast, cells which have spiking data rates ("high traffic" cells) may not have enough gain or processing capability to fully support those customers. Thus, in order to make better use of the available UAV power, the UAV radio sub-system (112 in FIG. 1) can allocate an uneven amount of power for each of its spiking cells. The power from the low traffic cells can be redirected to boost the power to high traffic cells. In other words, the UAV radio sub-system uses power control to adjust the power allocated to different UAV co-active beams so as to provide more power to the beams whose cells have more traffic. Various embodiments of beam-specific power control may allocate the boost power for a variety of performance enhancing techniques. For example, the boost power may be used to increase a transmit power and/or a receive gain of the transceiver.

The beam-specific power control as described above may be further used to enable higher throughput to beams whose cells have more traffic, and adjust the UAV throughput to traffic conditions in the coverage area. For example, in the UAV beam network design described in conjunction with FIGS. 3A and 3B, the UAV forms beams on a contiguous set of cells on the ground that cover a certain coverage area. In one exemplary variant, the UAV radio sub-system may allocate less power to beams that cover low traffic cells and more power to beams that cover the higher traffic cells. Similarly, in the UAV beam network design described in conjunction with FIGS. 5A and 5B, the UAV only transmits to a subset of the cells at any particular time; consequently, in one exemplary variant, the UAV can utilize much higher power amplification schemes to maximize data throughput for the co-active cells. Artisans of ordinary skill in the related arts will readily appreciate that beam-specific power control is widely applicable to many other different network configurations, given the contents of the present disclosure.

While the foregoing discussion has been presented primarily in relation to power, the various principles described herein may be readily applied to virtually any limited resource. Common examples of limited resources include without limitation: power, time, frequency, spreading codes, components (e.g., antennas, processors, etc.), memory, thermal dissipation, etc. For example, a low traffic cell may be allocated fewer time slots or frequency bands during coverage, the excess time slots or frequency bands being allocated to high traffic cells. Various other substitutions may be made with equal success, given the contents of the present disclosure.

Link Layer Data Rate Determination —

For network configurations that only service portions of the network coverage area (see e.g., Sequential Beam Pointing discussed supra), services that are not in the co-active cells must be postponed for transmission/reception. One metric for measuring such performance is a so-called network data transfer efficiency that is characterized by the ratio of the data that was transferred as a portion of the total data that was ready for transfer. Another aspect of the present disclosure describes systems and methods for optimizing network data transfer efficiency. Common examples of data rate measurements may include without limitation: bit error rate (BER), packet error rate (PER), block error rate (BLER), total data throughput, peak data throughput, average data latency, peak data latency, etc.

In one exemplary embodiment, the network data transfer efficiency can be evaluated based on Link Layer Data Rate Determination (LDRD) which is the amount of data that is transferred at the so-called Link Layer. Specifically, the UAV performs LDRD in order to monitor and maximize the overall system throughput. During normal operation, the UAV and terminal radio sub-systems determine the highest data rate that the UAV and the ground terminal can transact data subject to certain pre-defined criteria. For example, the highest acceptable data rate may be determined to be the data rate that does not exceed a threshold packet error rate (PER) at the ground terminal and/or UAV receivers; in such cases, the acceptable PER is determined based on a measured signal to interference plus noise ratio (SINR) at the terminal and UAV receivers. Other methods for determining the highest acceptable data rate may be based on other error measurements (e.g., BER, BLER, etc.) and/or other channel measurements (e.g., received signal strength indication (RSSI), carrier to noise ratio (CNR), etc.) Still other methods may consider other factors and/or weight different types of data differently based on e.g., data requirements (e.g., throughput, latency, etc.), quality of service (QoS), customer requirements, etc.

There are two (2) distinct approaches for performing LDRD: (i) so-called "closed loop" and (ii) so-called "open loop" schemes.

In closed loop variants, the UAV and ground terminals communicate quality measurements via a feedback loop between the UAV and terminal radio sub-systems. In other words, the UAV and terminal receivers each measure the SINR received on their respective uplinks and downlinks respectively, and report the measured SINR to each other. Based on the reported SINR, the terminal and UAV radio sub-systems can transmit data at the highest rate that is acceptably decodable for the given SINR values. In some cases, the acceptable data rate is pre-determined (via e.g., empirical observations of the manufacturer, network simulations, etc.) In other cases, the acceptable data rate is dynamically determined based on e.g., historic analysis, predicted conditions, data usage, etc. Alternatively, in open loop variants, the UAV and ground terminals do not exchange quality measurements i.e., there is no feedback loop between the UAV and terminal radio sub-system.

As previously alluded to, the primary source of interference that can be controlled, and adversely affects the measured SINR is cross-beam interference. Cross-beam interference can be introduced from neighboring co-active and co-frequency beams, interference received from other antenna polarizations in dual polarization antenna operation, etc. Other sources of interference may be compensated for (by increasing gain, coding complexity), or avoided (e.g., by changing transmission time intervals, frequency bands, spreading codes, etc.), but the UAV only has direct control over which beams are active, and thus how much cross-beam interference is present. Accordingly, in some variants, the SINR may be further partitioned into the amount of interference due to cross-beam interference, and the amount of interference which is attributable to the radio channel.

In order for the UAV and terminal receivers to measure the received SINR, the terminal and UAV transmitters each send a signal (such as 222 and 212 in FIG. 1) so that the respective UAV and terminal receivers can measure the received SINR on the uplink and downlink channel. While the foregoing example is presented in terms of transacted messages (e.g., so-called "live" data), other schemes may be substituted with equivalent success given the contents of the present disclosure. For example, in some cases, the UAV and/or terminals could transmit so-called "pilot channels", "beacons", "training sequences", etc. as are commonly found within the related arts. For such embodiments, a receiver that can readily identify the portion of SINR directly attributable to cross-beam interference may provide such identification information for improved interference mitigation and/or network utilization analysis. For instance, a neighboring beam that introduces cross-beam interference could be identified based on its beacon signature, and disabled in the event that the neighbor's traffic is of a lower priority.

While closed-loop feedback allows for accurate interference mitigation of short distances for UAVs that are located at a sufficiently high altitude, round trip propagation (RTP) may introduce significant complications in a closed loop feedback system. Consider a UAV that is located fifty (50) kilometers (km) from a ground terminal; in order to measure SINR, the terminal must: transmit a signal to the UAV, whereupon the UAV receiver measures the received SINR and responsively sends the measured SINR back to the terminal. The total round trip delay is approximately 333.33 micro-seconds (ms). Since neither the UAV nor the terminal is aware of the channel conditions until they receive the SINR measurements, the UAV and terminal must use lower than optimal data rates to avoid high packet error rates. Once each end of the link receives the reported SINR measured at the other end, the link can switch to an optimal rate (e.g., that sustains the acceptable PER, etc.) for the current data transmissions based on the measured SINRs. However, under the closed loop scheme, each SINR update lags the current conditions by 333.33 ms. For high data rates, the measurement lag can be significant; for example, when the data links operate at very high data rates (e.g., one (1) gigabit per second (Gbps) or higher), the large round trip delay can result in a loss of throughput due to less than optimal data rates. More directly, since the actual SINR of the channel may have changed since the reported SINR, the link may be using an underweight error coding scheme (resulting in larger than anticipated error rates), or an overweight error coding scheme (resulting in less data throughput).

Open loop schemes are less susceptible to time lag issues when compared to closed loop schemes. However, open loop schemes may be more difficult to accurately coordinate between the UAV and the ground terminals, as there is no explicit feedback mechanism. Moreover, since the downlink (UAV to ground terminals) may have different considerations than the uplink (ground terminals to the UAV), various embodiments of open loop operation may require different management techniques which are adapted to reflect the asymmetric relationship.

Referring now to downlink open loop LDRD, in one exemplary embodiment, the UAV radio sub-system estimates a received signal quality metric (such as SINR) at the ground terminal based on e.g., knowledge of UAV transmit power, estimated propagation loss from the UAV to the terminal, and the antenna gains from UAV beams toward the ground terminal, etc. In one such variant, to simplify the description of the embodiment the description ignores negligible sources of interference e.g., from cross-polarization terms (generally, cross-polarization terms are significantly smaller than the interference from the main polarization and can be estimated similar to the cross-beam interference estimation embodiments).

As previously noted, cross-beam interference is a function of the number and intensity of co-active co-frequency beams. Thus, during data transmissions between the UAV and a given terminal, the cross-beam co-frequency interference may change whenever co-active co-frequency beams stop or start transmitting. As the interference component (I) of SINR changes, the maximum decodable data rate on the corresponding link will also change; this may be reflected by changes in acceptable packet error rate (PER) thresholds. In the open loop LDRD mechanism, the UAV radio sub-system has knowledge of the transmissions to each ground terminal during each time slot, and can therefore estimate the SINR on the downlink seen by the terminals during each slot. Based on these estimates, the UAV can change the data rate during each time slot to adjust for changes in the interference conditions.

Consider the following analysis of interference experienced by an exemplary downlink transmission. The UAV serving beam is the UAV beam that a given terminal is associated with; the UAV serving beam sends/receives data to/from the terminal. Interfering UAV beams use the same frequency as the UAV serving beam (i.e., co-frequency beams) and are active within the same time interval (i.e., co-active). As previously noted, cross-polarized antenna beams can be ignored to simplify the description since their effects are negligible. However, the following description may be generalized to also account for cross-polarization interference.

The downlink interference power from co-active co-frequency and co-polarization beams seen by the terminals is given by:

$$DI_l = \sum_{j=1}^{N} DI_{lj} \qquad (1)$$

Where:

$DI_l$ is the total co-frequency and co-polarization interference from all N co-active co-frequency and co-polarized beams at terminal l; and $DI_{lj}$ is the co-frequency co-polarization interference power received from the UAV interfering beam j at terminal l during the co-active interval.

$DI_{lj}$ is given by:

$$DI_{lj} = A_l UP_j TG_l UG_{Dlj} \qquad (2)$$

Where:

$A_l$ is propagation loss from the UAV to terminal l;

$UP_j$ is transmit power from the UAV interfering beam j;

$UG_{Dlj}$ is the antenna gain from beam j of UAV toward terminal l in the downlink direction; and $TG_l$ is the antenna gain from terminal l toward the UAV.

Since the UAV radio sub-system controls and manages the co-active transmission time slots and/or frames and transmission powers, the UAV radio sub-system can estimate the effects of co-active co-frequency co-polarization beams on its serviced ground terminals in accordance with equations (1) and (2) (discussed supra). More directly, the UAV radio sub-system can estimate the interference a given terminal l will receive from co-active co-frequency beams. Sophisticated variants may further consider both the terminals' position coordinates, and the UAV position coordinates (and roll, pitch, and yaw) based on the GPS and gyroscope/accelerometer located as part of the UAV radio sub-system. In such variants, the UAV radio sub-system can take into account the UAV's position and orientation when determining the amount of UAV beam gains toward the terminal and also when computing the propagation path loss from the UAV to the terminals.

Once, the downlink interference power from co-active co-frequency and co-polarization beams has been calculated, the UAV sub-system can estimate the SINR. SINR is given by:

$$SINR = \frac{S_l}{DI_l} \qquad (3)$$

Where $S_l$ is the desired signal power received at terminal l from UAV serving beam that provides coverage to terminal l. $S_l$ is given by:

$$S_l = A_l UP_l TG_l UG_{Dl} \qquad (4)$$

Where $UG_{Dl}$ is the UAV serving beam gain toward terminal l in the downlink direction.

After the UAV radio sub-system has estimated the downlink SINR received at the terminal based on equation (3) (provided supra) during a given downlink time slot or frame, the UAV sub-system can select the appropriate data rate to transmit data packets to the terminal based on the acceptable packet error rates (PER) for the corresponding SINR. More directly, the open loop downlink LDRD estimates the downlink SINR and the corresponding achievable data rate based on information that is present at the time of transmission, and can be calculated without any delay (i.e., does not require feedback input).

Unlike the UAV, ground terminals do not have the same control over the communication medium. Specifically, the ground terminals will need to consider both shared medium access and dedicated medium access. Consider first the uplink dedicated channels, where the UAV radio sub-system processor has assigned certain time slots on the uplink to each ground terminal and sent the channel assignments in a downlink assignment message. Since the UAV radio sub-system processor has generated the channel assignment for each terminal in different cells/beams during a given uplink dedicated channel, the UAV radio sub-system processor can estimate all uplink dedicated channel assignments to the different terminals for the time slot, and thus also estimate the SINR that the UAV will see from each terminal during that time slot.

The uplink interference power from co-active co-frequency and co-polarization terminals is given by:

$$UI_l = \sum_{j=1}^{M} UI_{lj}, \qquad (5)$$

Where:

$UI_l$ is the total co-frequency co-polarization interference from all M transmitting interfering terminals as seen on the uplink by the UAV receiver when decoding packets of terminal l; and $UI_{lj}$ is the co-frequency co-polarization interference power received from interfering terminal j as seen on the uplink by the UAV when decoding packets of terminal l.

$UI_{lj}$ is given by $$UI_{lj} = A_j TP_j TG_j UG_{Ulj}, \qquad (6)$$

Where:

$A_j$ is propagation loss from the UAV to the interfering terminal j;

$TP_j$ is transmit power from interfering terminal j;

$UG_{Ulj}$ is the antenna gain from the UAV beam that serves terminal l toward interfering terminal j in the uplink direction; and $TG_j$ is the antenna gain from interfering terminal j toward the UAV.

The uplink SINR seem at the UAV from terminal l is then given by $$SINR = \frac{S_l}{UI_l}, \qquad (7)$$

Where:

$S_l$ is the desired signal power received from terminal l at the UAV, and is given by:

$$S_l = A_l TP_l TG_l UG_l \qquad (8)$$

Where:

$TP_l$ is the terminal l transmit power, $TG_l$ is the terminal l antenna gain toward the UAV, and $UG_{Ul}$ is the gain of the UAV beam that serves terminal l toward terminal l in the uplink direction.

As previously noted, since the UAV radio sub-system processor has assigned the dedicated channel assignments for the uplink to different terminals, the UAV radio sub-system can predict which terminals will be transmitting during a given uplink dedicated time slot or frame. Therefore, the UAV radio sub-system can estimate the uplink SINR for all terminals that are scheduled to transmit during a time slot based on equations (5) through (7) described above. Based on the estimated received uplink SINR, the UAV radio sub-system processor determines the data rate that each terminal should use when transmitting data to the UAV during the assigned uplink time slot. The UAV radio sub-system sends the corresponding data rate indices to the terminals in the channel assignment message that contains the terminals' uplink dedicated channel assignments.

As will be appreciated by artisans of ordinary skill in the related arts, the UAV beams' gain toward the terminals in the UAV coverage area is a function of the UAV position and orientation (roll, pitch and yaw), as well as the position of the ground terminals. Consequently, in some sophisticated embodiments, the UAV radio sub-system compensates for the UAV position and orientation (roll, pitch, and yaw) when computing the UAV beams' gains toward the terminals used in the interference and SINR estimation equations (1) through (7) described above. In other embodiments, the UAV radio sub-system compensates for the UAV position and orientation when steering the UAV beams' gains toward the terminals (electrically and/or mechanically).

Once a data rate is chosen on the downlink to each terminal, then power control may be used to minimize the total power transmitted by the UAV on all beams while ensuring that the required SINR to achieve the chosen data rate is achieved on the downlink to each terminal. Various embodiments of the UAV radio sub-system may implement any number of power optimization schemes; for example, one such scheme minimizes the total UAV transmit power. In another example, the UAV radio sub-system may minimize the total UAV transmit power over all beams while constraining the transmit power on certain beams to specific values. Similarly, the UAV may optimize the transmit power from each terminal according to a number of power optimization criteria subject to achieving the required SINR on each uplink based on the chosen data rate on each uplink; under such variants, the UAV sends the computed transmit powers to each terminal for uplink transmission.

Antenna Pattern Measurement —

Simple embodiments of the present disclosure may operate under the assumption that the antenna pattern is uniform throughout the cell coverage area; however, more sophisticated embodiments may optimize performance depending on antenna pattern measurements. For example, in discussions of open loop LDRD embodiments supra, the identified equations for the UAV radio sub-system either empirically determine, estimate, or assume, the UAV antenna beams' gains toward different terminal locations as a function of the terminal location as well as the UAV's position and orientation. Accordingly, various aspects of the present disclosure are directed to systems and methods for computing and/or estimating the UAV beams' gain toward different terminal locations as a function of the UAV position and orientation.

In one exemplary embodiment, the UAV antenna beams' patterns are measured a priori in an outdoor range with respect to different UAV antenna orientations and stored in a table. During subsequent in-service operation, the values in the table can be used by the UAV radio sub-system in the interference and SINR calculations (such as those identified in the open loop LDRD scheme described above). The aforementioned a priori test measurements are made under typical operating conditions (e.g., the UAV antenna structure is manipulated in a manner similar to how it would move during the UAV's normal travel in its cruising orbit, including changes in the orientation of the UAV). Ideally, measurements are made in a realistic scenario that is set up to provide far field beam patterns as similar as possible to the conditions in the actual UAV flight.

In another embodiment, the UAV antenna beams' gains toward the different terminal locations on the ground as a function of UAV's position and orientation may be empirically measured as the UAV cruises in its orbit during the actual operation of the UAV at altitude. As the UAV cruises in its orbit, the UAV radio sub-system transmits a known reference signal that is detected by the terminals on the ground. The terminals search for reference signals transmitted from UAV's co-frequency beams, and measure the interference. In the exemplary open loop LDRD variant, the UAV may perform interference measurements based on equation (2), supra. For example, the aforementioned equation (2) can be used to derive the combined UAV beam and terminal antenna beam gains ($TG_jUG_{Dlj}$) based on the path loss from the UAV to the terminal ($A_l$), the receiver integrator processing gain PG, and the interfering co-active co-frequency UAV beam transmit power ($UP_j$) (these quantities are locally available to the UAV).

With regard to the ground terminal, the ground terminal can compute $UG_{Dlj}$ based on the UAV beam j gain toward terminal l, because the terminal peak antenna gain toward the UAV can be estimated to reasonable certainty, within the antenna pointing error. Therefore, the different terminals in the UAV coverage area may make measurements on reference signals sent by the UAV's co-frequency beams and compute the UAV beams' gains toward the terminal, i.e. the downlink UAV beams' gains $UG_{Dlj}$. Once the ground terminal has calculated $UG_{Dlj}$, the terminals send the measured UAV beam gains to the UAV. Similarly, the UAV radio sub-system measures the uplink UAV beam gains $UG_{Ulj}$ (see e.g., from equation (6) exemplary open loop LDRD variant), where the terms $UI_{lj}$ can be directly measured by the UAV radio based on detecting reference signals transmitted by the terminals. In one such variant, the reference signals transmitted by terminals in different UAV beams are further encoded by a UAV beam specific code so that the UAV radio sub-system can determine which co-frequency beam a given terminal is communicating.

The empirically gathered uplink and downlink performance data can be stored for future use, and/or uploaded for offline analysis to further optimize performance. In some cases, analysis of multiple sets of empirical data collected from multiple UAVs may be used to further inform network management/modeling and improve operation of an entire fleet of UAVs, etc. To these ends, in one exemplary embodiment, the UAV radio sub-system processor stores: (i) the downlink UAV beam gains $UG_{Dlj}$ and $UG_{Dl}$ toward the terminal received from the terminals, (ii) the uplink UAV beam gains $UG_{Ulj}$ and $UG_{Dl}$ measured by the UAV radio sub-system, and (iii) the UAV's position and orientation at the time of measurements, within a data structure. The contents of the data structure can also be used for in-service operations (e.g., the UAV downlink and uplink antenna measurements can be used in computing the downlink and uplink SINR during the downlink and uplink time slot assignment in the open loop LDRD process, etc).

In one exemplary embodiment, the terminals and the UAV make UAV beam measurements as described above during at least one full pass of the UAV around its cruising orbit so as to create a table of UAV beam gains toward each terminal for all UAV positions and orientations. In some variants, the measurements are repeated periodically as the UAV cruising orbit and orientation limits may change with time due to external conditions such as weather conditions (e.g., wind, rain, humidity, etc.) Periodic measurements of UAV antenna beams' gain toward the terminals ensures that the table of UAV beam pattern versus UAV position and orientation has current patterns and information for most (if not all) UAV positions and orientations during operation.

Referring back to equations (2) and (6) of the open loop LDRD embodiment described supra, the interference terms ($DI_{lj}$ and $UI_{lj}$) are largely attributed to the co-frequency beams whose undesired sidelobes are parasitically received by the terminal; in most practical applications, these interference terms are weak signals. Accordingly, in one exemplary embodiment, the UAV's reference signal is specifically designed so that ground terminals can detect the reference signal and compute the received strength based on the weak signal strength of the sidelobes of the UAV co-frequency beams. In one exemplary variant, the reference signal is repeated over a long time interval to ensure detection when the signal is weak. In other variants, the reference signal may be spread over a long spreading code (thereby allowing for recovery even under high noise environments). In order to recover the spread reference signal, the terminal receiver integrates the known reference signal over a long enough time period to achieve enough processing gain so that the terminal may even detect weak signals. In some such variants, the reference signals sent from different UAV beams are encoded using a beam dependent code so that the terminals may search for the reference signals from different beams, and use the interference terms associated with different co-frequency beams in estimating the UAV beam gains ($UG_{ij}$) toward terminal as described above. Various other methods for reference signal delivery will be readily appreciated by those of ordinary skill in the related arts.

The embodiments in this disclosure were described in the context of UAVs. However, the embodiments also apply to Low Earth Orbit (LEO) satellites, and NGSO satellites systems in general. Specifically, the embodiments regarding the beam network formed in the coverage area of the UAV may also be used to form beams for LEO satellites in their coverage area to maximize the LEO satellite throughput. The embodiments that describe LDRD also apply to LEO satellite systems to find the highest data rate the satellite beams and the terminals on the ground may send data to maximize system throughput.

Terminal Position Location Determination —

As mentioned above, the position coordinates of the terminals can be used by the UAV in order for the UAV to point a focused beam on the terminal. For example, in one embodiment, the position coordinates of the terminal may be measured (e.g., using a GPS device at the location of the terminal) and sent to the UAV using the link between the UAV and the terminal on a broad beam. In another embodiment of this disclosure, the UAV may estimate the position coordinates of the terminal using multiple range measurements. As mentioned above, the UAV travels on a cruising orbit, but the terminal's position is relatively fixed. The terminal and UAV may make range measurements at multiple locations on the cruising orbit of the UAV and trilaterate and/or triangulate the measured range values to estimate the location of the terminal. In one such variant, the UAV has knowledge of its position coordinates $P_c=(x,y,z)$ using a GPS device installed on the UAV. The UAV 110 and terminal 120 (FIG. 1) may make Round Trip Delay (RTD) measurement using the messages 212 and 222 between the UAV 110 and the terminal 120. The UAV 110 radio sub-system 112 records the time the message 212 is sent to the terminal 120. The terminal 120 sends back message 222 to the UAV, message 222 including information such as the time the message 222 is transmitted, to allow the UAV radio sub-system 112 to estimate the RTD(j) between the UAV and the terminal, where j is an integer identifying the j-th UAV position on the orbit. The RTD(j) measurement is then converted to distance, d(j), using the speed of light and compensating for UAV movement, etc. As the UAV travels around its orbit, the RTD(j) and the corresponding distance between the UAV and the terminal, d(j), is measured from at least three (3) positions. Then, the distances between the UAV and the terminal d(j), and the corresponding UAV position coordinates $P_c(j)$, are used by the UAV or the terminal in the trilateration algorithms (or triangulation algorithms) to estimate the terminal's position coordinates.

Hand-Off of Terminal Between UAV Beams—

For embodiments of FIG. 3 which have beams that are fixed with respect to the UAV, the beams will move on the ground relative to the terminals, and the terminals must hand-off from one beam to another as the beams move. The beam on which the terminal is communicating with the UAV is referred to as the current beam. The beams that are adjacent to the current beam are referred to as the neighbor beams. The UAV 110 and the terminals 120 measures signal metrics such as Signal to Interference plus Noise Ratio (SINR) on signals received on the current and neighbor broad beams, such as 212 shown in FIG. 1. The UAV radio sub-system 112 compares the signal quality, such as SINR, of the current beam to that of the neighbor beams, and if the signal quality of a neighbor beam is within a certain threshold of the current beam then the terminal can initiate hand-off. The beam with strongest signal quality from among the neighbor beam will be chosen as the beam to which to hand-off (referred to as the candidate beam) and the terminal may request that the UAV hand-off the terminal to the candidate beam.

As previously described in FIGS. 5A and 5B, certain embodiments may use "fixed" beams that are fixed with respect to the UAV, the beams will move on the ground relative to the terminals, and the terminals can hand-off from one beam to another as the UAV beams move. Accordingly, in one exemplary embodiment, the terminal radio sub-system (122 in FIG. 1) makes signal quality measurements, such as SINR, on the reference signals transmitted from the UAV serving beam, as well as on signals of the non-serving beams neighboring the serving beam (when the neighboring beams are active). The terminal's radio sub-system processor compares the signal quality metric measured on the serving beam and the non-serving neighboring beams. When the signal quality of a neighboring beam meets certain selection criteria (e.g., greater than the serving beam, within an acceptable threshold power of the serving beam, has increasing signal power relative to the serving beam, etc.), the terminal radio sub-system will attempt to initiate hand-off to this "candidate hand-off beam". In one such variant, the terminal radio sub-system sends a hand-off message to the UAV radio sub-system requesting that the terminal be handed off to the candidate hand-off beam. The UAV radio sub-system subsequently associates the terminal to the candidate hand-off beam and routes all packets from/to the terminal to the candidate hand-off beam. In other variants, the terminal may identify multiple candidate hand-off beams, which the UAV radio sub-system selects for hand-off. In still other variants, the terminal may simply initiate a hand-off to the candidate hand-off beam without requiring UAV instruction.

In another embodiment, the terminal or the UAV radio sub-system may decide to carry out a hand-off from the UAV beam currently communicating with the terminal (so called serving beam) to another UAV beam based on the UAV position coordinates and orientation that are reported by the UAV to the terminals. The terminal or the UAV radio sub-system can use the UAV position coordinates and orientation to determine the relative position of different UAV beams and decide whether hand-off to another beam is desired according to a certain performance criterion. For instance, the terminal or the UAV radio sub-system may estimate the downlink/uplink SINR seen at the terminal or the UAV using the UAV antenna patterns seen at the terminal corresponding to the UAV position coordinates and orientation; based on that information, the terminal may evaluate the beams that provide coverage to the terminal, and initiate a hand-off if a beam other than the serving beam provides a higher SINR. Artisans of ordinary skill in the related arts may substitute other hand-off techniques with equivalent success, given the contents of the present disclosure.

For embodiments where the UAV beams are fixed with respect to the UAV and the UAV beams move on the ground as the UAV travels in its cruising orbit, handoffs may occur frequently. For example, in some cases the terminal may experience hand-offs from one UAV beam to another as the UAV travels around its orbit. Since, the UAV serving beam and the co-frequency interfering beams for the terminal will change after hand-off, thus for such embodiments, the table of UAV serving beam gain and the co-frequency interfering beam gains toward each terminal may include information for multiple UAV serving beams so as to better compare among candidate beams.

For embodiments which have beams that are fixed on certain locations on the ground, as illustrated in FIG. 3C, the UAV processor 314 sends the position location and orientation of the UAV provided by gyroscope/accelerometer/GPS sub-system 319 of the UAV radio sub-system 112, to the UAV antenna sub-system 114; the UAV antenna sub-system 114 uses the information to steer the beam to be fixed on a given location to compensate for the UAV movements as the UAV travels in its cruising orbit. This information is sufficient (along with the terminal's own location information) to predict the likely candidate beams.

When a terminal is inactive (i.e., not sending/receiving data), the terminal may go into a lower power mode (e.g., a sleep mode, an idle mode, and/or other reduction in power consumption.) Whenever the terminal has data to send to the UAV (e.g., based on periodic updates or other triggering event), the terminal wakes up out of sleep mode and accesses the uplink shared channel to send data and request a dedicated uplink channel (if needed). In one exemplary variant, the terminal will scan for different beams and choose the beam from that has the strongest received signal with which to communicate with the UAV. The terminal may also periodically wake up during specific time slots so that the UAV can inform the terminal that it has data to transmit to the terminal; these time slots are referred to as "wake up time slots" in this disclosure.

In some variants, the terminal is assigned a wake up time slot by e.g., the UAV or other network management entity. For example, once the UAV has data to send to a terminal that is in sleep mode, the UAV radio sub-system will wait for the wake up time slot, and then send a wake up message to the terminal during the terminal's previously determined wake up time slot. The wake up message informs the terminal that it needs to prepare to receive data, i.e. come out of sleep mode.

In other variants, the terminal and UAV share a common mechanism for determining a wake up time slot (e.g., via a shared hashing algorithm, etc.) For example, the terminal may listen to a wake up time slot of a beam that has the strongest signal. The UAV radio sub-system may, however, not know which beam the terminal is monitoring. Since the terminal does not know which UAV beam and corresponding wake up time slot the UAV radio sub-system is monitoring, in some cases, the UAV radio sub-system sends the wake up message destined to a given terminal on all beams during the wake up time slot, ensuring the terminal will receive the wake up message. Such broadcast schemes may consume significant network resources. Thus, in another embodiment, the UAV acquires or estimates the terminal's position coordinates (e.g., based on out-of-band information, historic use information, and/or other actual/prediction of location information) and based on the current position and orientation of the UAV, the UAV radio sub-system sends the wake message on an appropriately selected sub-set of the beams that are providing coverage to the terminal.

UAV Antenna Design —

Figure 6A:
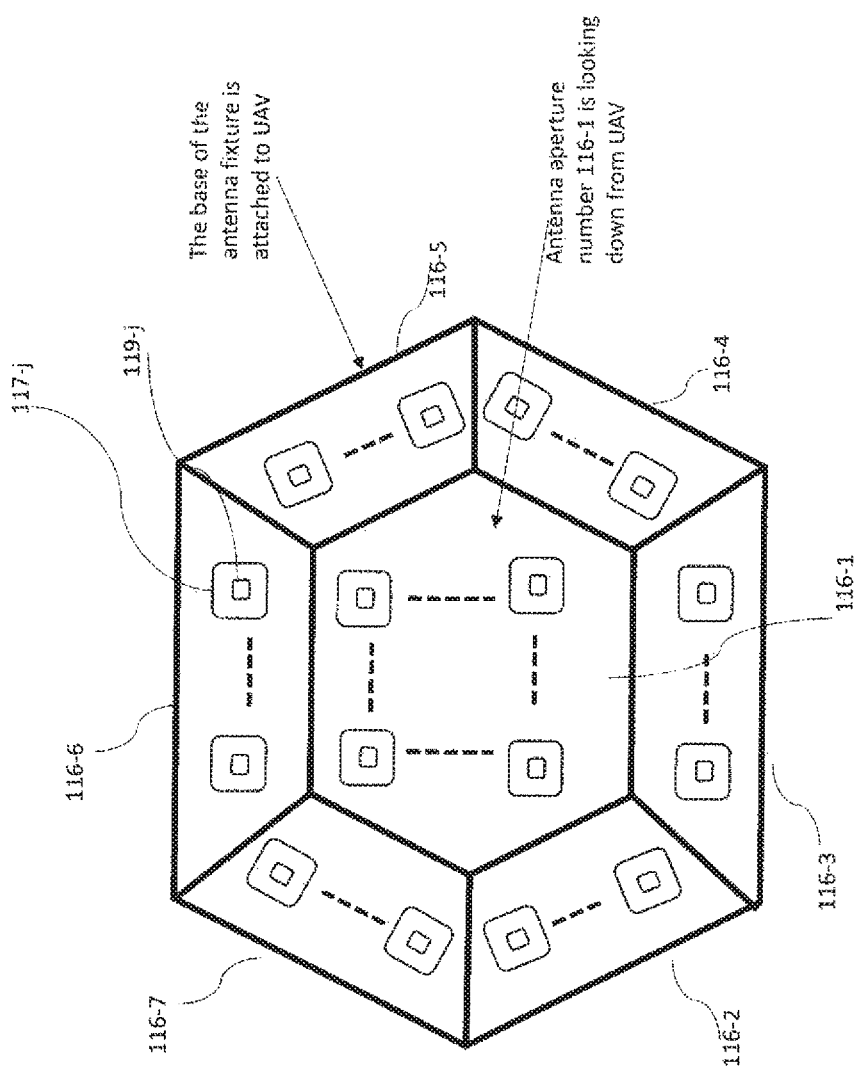
FIG. 6A is graphical depiction of an exemplary unmanned aerial vehicle (UAV) antenna structure that is configured to form beams toward the coverage area via mechanical actuators useful in conjunction with the various principles described herein.

FIG. 6A shows an exemplary UAV antenna fixture. As shown, the exemplary antenna fixture is composed of 7 faces, labeled as 116-$j$ where j is the index of the different faces j=1, 7. Face 160-1 covers the area under the aerial platform that is closer to the center of coverage. The trapezoidal base of the antenna fixture is attached to underneath the aerial platform. Faces 116-2 through 116-6 cover areas that are father from the center of coverage of the UAV. Each of the 7 faces of the antenna fixture of FIG. 6A may be considered a different antenna aperture covering a different geographic area. The 7 faces may be separate and placed on different locations under the UAV to cover different areas on the ground. Artisans of ordinary skill in the related art may substitute antenna fixtures with any number of antenna apertures (similar to faces of the antenna fixture of FIG. 6A), given the contents of the present disclosure.

In some variants, each antenna face 116-$j$ includes multiple antenna sub-apertures 117-$k$, where k is the label of different sub-apertures. Each sub-aperture 117-$k$ generates one beam toward one cell of the coverage area. Each antenna sub-aperture 116-$j$ is attached to an actuator 119-$k$ which is controlled by processor 314. Once the processor 314 has computed the pointing angles of each antenna sub-aperture 116-$k$, it instructs the actuator 119-$k$ to tilt the sub-aperture 117-$k$ according to the computed pointing angle.

Figure 6C:
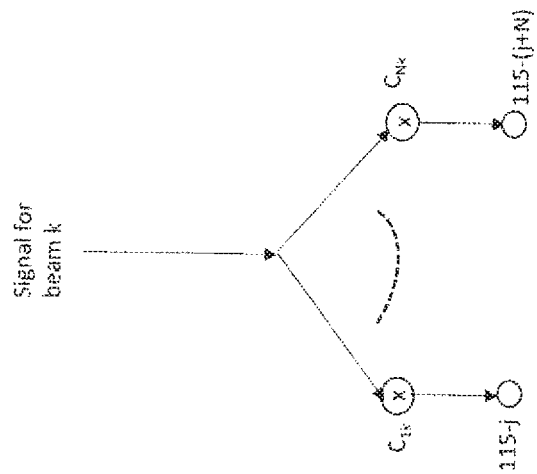
FIG. 6C is graphical depiction of a phased array beam forming approach useful in conjunction with various embodiments of the present disclosure.
Figure 6B:
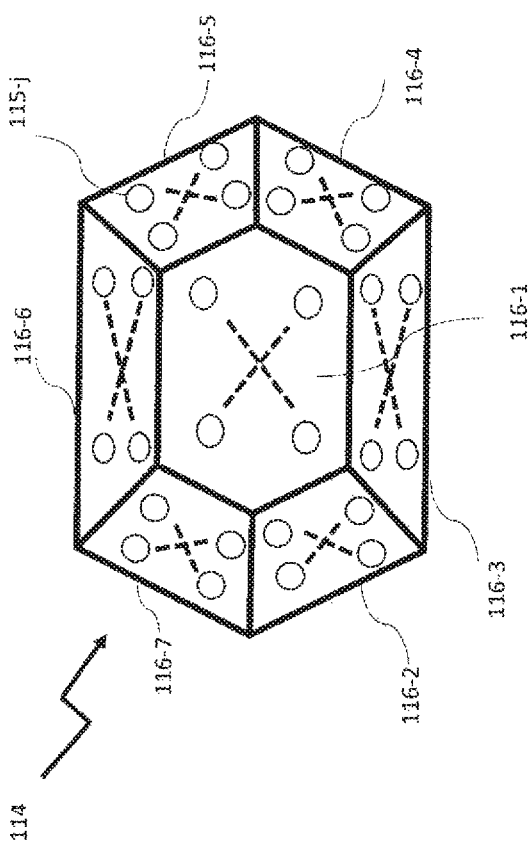
FIG. 6B is graphical depiction of a multiple type beam system useful in conjunction with the various principles described herein.

In one aspect of the antenna system design, the antenna beam is electronically formed via e.g., a phased array, to point the beams that cover each cell on the ground. As shown in FIG. 6B, each antenna face contains multiple antenna elements 115-$j$ spaced at substantially half the transmission and/or reception wavelength, where j is the label of the different antenna elements. The same antenna aperture face may generate multiple beams, each beam covering a different area on the ground. In most practical applications, the transmission and reception wavelengths are not significantly different (e.g., only differing by a few megahertz, at gigahertz frequency carrier ranges), accordingly the half wavelength distance is predominantly based on the carrier frequency. However, those of ordinary skill in the related arts will readily appreciate, given the contents of the present disclosure, that where the transmission and reception wavelengths are substantially separated, the half wavelength distance would be different between transmission and reception antenna fixtures.

Once the processor 314 has computed the pointing angles for beams toward each cell on the ground, it instructs the antenna sub-system 114 to form beams toward each cell at the corresponding pointing angles. FIG. 6C illustrates a phased array beam forming approach where the antenna sub-system 114 forms each beam by multiplying the signal destined for the k—the beam by coefficients $C_{jk}$ (j=1, N) and sending the results to a subset of N antenna elements 115-1 through 115-N.

Terminal Antenna Steering Design —

As discussed above, and depicted in FIG. 3A, the UAV 110 travels around a cruising orbit 610. The UAV also moves to different altitudes during the day and night, higher altitudes during the day and lower altitudes at night. In order to maintain high antenna gain toward the UAV, the terminal antenna 124 steers its beam toward the UAV to track the position of the UAV. An electronically steered antenna, such as phased array technology, is one antenna system option to track the UAV. One drawback of a purely electronically steerable antenna approaches, such as the phased array, is their current high cost. For an electronically steerable antenna to steer its beam to track the UAV position, the antenna aperture needs to be initially pointed toward the UAV's cruising orbit. If the terminal antenna is pointed manually toward the UVA, it will increase the installation cost as effort must be expended to manually point the antenna during the installation process. Another issue with a solely electronically steerable antenna is flexibility. For example, if the UAV's position is changed or if additional UAVs are deployed, and it is desired to point the terminal's antenna toward the UAV's new position or toward the newly deployed UAV, then the terminal's antenna must be manually pointed to the new UAV position. It can be very costly and time consuming to reposition the antennas of a large number of installed terminals.

A mechanically steerable antenna has the benefit that during the installation the terminal may mechanically steer its antenna toward the UAV cruising orbit without any manual intervention and the associated cost. The terminal antenna sub-system 124 depicted in FIG. 7, includes two axis mechanical steering mechanisms 127 and 128. At installation time, the terminal radio sub-system 122 mechanically steers the antenna aperture 126 to different positions and searches for the signal 212 (FIG. 1) until it detects the signal transmitted by the UAV 110. Once the signal from the UAV is detected, the terminal radio sub-system 122 may continue the search process to more finely point the antenna aperture 126 toward the UAV 110.

If the beamwidth of the antenna is very narrow, say less than four (4) degrees, then one potential issue with mechanically steerable antenna is its ability to point a beam accurately toward the UAV while maintaining the cost low antenna cost for home terminals. Generally, it is possible to design a good enough mechanically steerable structure for accurate beam pointing, but the cost of the mechanical parts (e.g., at that manufacturing tolerance) may be too high for a consumer product. Therefore, a mechanism is needed to reduce the beam pointing requirement of the mechanical structure while achieving high antenna gain and low terminal cost. In one embodiment of this disclosure, multiple antenna sub-apertures 118-$j$, j index of the apertures of the same type whose beamwidth is larger than that of aperture 126, are used to create the larger antenna aperture 126. For instance, one can create an antenna with same aperture size by combining four (4) smaller antenna sub-apertures, each having an area one quarter that of the larger antenna aperture; by combining signals from the four (4) smaller antenna sub-apertures, six (6) decibels (dB) can be gained which results in an equivalent net gain to that of the larger single aperture. However, the beamwidth of each of the four (4) smaller sub-apertures will be half that of the larger antenna. As a result, the mechanical beam pointing accuracy requirement is reduced due to the wider beamwidth of each of the four (4) smaller sub-apertures.

In a phased array approach, antenna elements are placed a half wavelength apart and a large number of antenna elements are needed to achieve high gain. For instance, a circularly shaped antenna array at 28 GHz of diameter 30 cm requires about 666 antenna elements to achieve a high antenna directivity of about 36 dB. The beamwidth of such an antenna would be about 2.5 degrees. In the antenna design described in this disclosure, typically four (4) to eight (8) antenna sub-apertures are used to create a larger antenna aperture as described above. If four (4) dish antennas with diameter of 15 cm each, and 65% efficiency, are used as sub-apertures to create the larger antenna, then the beamwidth of each of the four (4) antenna will be about five (5) degrees versus the 2.5 degree beamwidth of the larger 30 cm diameter antenna. The gain of the combined four (4) 15 cm dishes is the same as that of the larger 30 cm antenna dish. If eight (8) dishes with size about 10 cm are used, then each of the 10 cm dishes will have a beamwidth of about seven (7) degrees and the combined gain of the 10 cm antenna dishes will be the same as that of the single 30 cm dish. Therefore, by using eight (8) dishes to create one larger dish the antenna assembly can provide a gain of the larger dish while significantly reducing the beam pointing accuracy requirement for the mechanical steering scheme. The complexity and cost of an antenna that includes four (4) to eight (8) antenna sub-apertures and combines the signals digitally (or via analog mixing) is much smaller than that of a phased array with about 666 antenna elements in the above example.

In one exemplary embodiment of the present disclosure, the terminal antenna structure of FIG. 7 is a hybrid of mechanical steering and electronic beam forming using multiple antenna sub-apertures. This design combines the benefit of mechanical and electronic steering to reduce the requirements on the mechanical steering mechanism while maintaining low complexity for the electronic beam forming mechanism. The hybrid scheme maintains accurate beam pointing to maximize the gain toward the UAV while reducing the complexity of antenna design and achieving low cost antenna constructions.

Referring now to FIG. 7, the antenna sub-apertures 118-$j$ are larger than the size of antenna elements needed in phased array antennas (such as depicted in e.g., FIGS. 5A-5C). In other words, sub-apertures 118-$j$ are themselves antennas such as dish antennas or flat panel antennas with high gains. Each of the antenna sub-apertures 118-$j$ are connected to the transmitter 416 and receiver 418 sub-systems of the radio sub-system 122 via antenna connections 417-$j$ and 419-$j$ respectively as shown in FIG. 7. In order to achieve higher gain than that of each sub-aperture 118-$j$, signals received from multiple antenna sub-apertures 118-$j$ may be combined digitally in baseband or in the analog domain by applying appropriate phases to the signal from each antenna aperture. On the transmit side, the signal may be transmitted only through one of the sub-apertures 118-$j$ but at higher PA (Power Amplifier) transmit power in order to compensate for the lower antenna gain of a single sub-aperture 118 versus the gain of the larger aperture 126. Alternatively, the transmit signal may be sent to all antenna sub-apertures 188-$j$, where the signal is phased appropriately and sent to each of the sub-apertures 118-$j$ to form a narrower, and higher gain beam toward the UAV than that of one sub-aperture 118-$j$.

In one embodiment, the terminal radio sub-system 122 uses the UAV position coordinates to point the antenna 126 toward the UAV using the mechanical steering mechanism. The position coordinates of the UAV are periodically sent to all terminals on a downlink message. The antenna design of this disclosure, depicted in FIG. 7, is capable of mechanical steering as well as electronic steering using the antenna sub-apertures 118-$j$. The mechanical antenna steering mechanism may have an error due to effects such as the stepper motor backlash or backlash due to wind loading. During each time slot, the receiver sub-system 418 combines the signals $R_k$ received on each antenna sub-aperture connection 419-$k$ using gains $\alpha_k$ and phases $\phi_k$ applied to the signals $R_k$ according to equation $$\Sigma_k R_k \alpha_k e^{j\phi_k} \tag{8}$$

The antenna sub-aperture signal combining equation (8) may be optimally combined in baseband or in analog domain to maximize a signal quality metric such as SINR.

Similarly, on the transmit side, the gain and phase of signal $S_k$ to be transmitted may be adjusted for each antenna sub-aperture 118-$k$ so that the resulting transmit beam "optimally" points toward the UAV. The gain and phase applied on the receive side, shown in equation (8), may also be applied to the signal being transmitted on each transmit antenna while correcting for the calibration difference between transmit and receive chains. The transmit signals sent to antenna sub-aperture 118-$k$ is then given by $S_k \alpha_k e^{j\phi_k} \beta_k e^{j\theta_k}$, where $\beta_k$ and $\theta_k$ are the gain and phase adjustment needed for each transmit antenna sub-aperture to account for the calibration difference between the transmit and receive chains, as well as the frequency difference between the uplink and downlink in FDD (Frequency Division Duplex) systems. In other words, $P_k$ and $\theta_k$ account for the hardware delay (phase) and gain differences in receive and transmit directions.

The terminal antenna steering mechanism described above is configured to track the movements of the UAV using mechanical steering as well as combining signals from multiple antenna apertures; this terminal antenna steering mechanism may also be used to track LEO (Low Earth Orbit) satellites. One exemplary antenna design is based on a phase array antenna that can electronically steer a beam to track a satellite. In some variants, a mechanical beam steering mechanism may also be needed to track the movement of the satellites; mechanical steering may be particularly important where the field of view of the phased array antenna is likely to be smaller than the spacing between two adjacent satellites. However, mechanical beam steering can add to component costs; for example, as described above in connection with tracking the UAV movement, the cost considerations for the mechanical steering mechanism may be affected by use scenarios. For example, where the beamwidth of the antenna is narrow, the mechanical mechanism may be more expensive (e.g., tighter tolerances are required where the beamwidth of the antenna is very narrow). Moreover, the mechanical steering performance may be susceptible to wind loading or other weather conditions (which does not affect electrical steering). Therefore, the hybrid antenna design illustrated in FIG. 7 and described in previous embodiments may achieve accurate antenna beam pointing toward the satellite while achieving low cost for the antenna system.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A ground terminal apparatus configured to form antenna beams toward an unmanned aerial vehicle (UAV), comprising:
    an antenna system comprised of at least one antenna aperture configured to form at least one beam toward the UAV;
    wherein the antenna system further comprises:
        at least one axis mechanical steering mechanism that uses UAV position location coordinates to mechanically point the at least one antenna aperture toward the UAV;
        wherein the at least one antenna aperture comprises a number of sub-apertures;
    a radio transmitter configured to transmit uplink signals to the UAV via the at least one beam;
    a radio receiver configured to receive downlink signals from the UAV via the at least one beam;
    wherein the radio receiver is further configured to modify a downlink signal with a gain and a phase adjustment and form a received beam based at least in part on the modified downlink signal;
    a processor sub-system, the processor sub-system further configured to control steering of the at least one beam to track a location coordinate associated with the UAV; and
    wherein the radio transmitter is further configured to:
        weight an uplink signal for each one of the number of sub-apertures by a second gain and a second phase adjustment corresponding to the gain and the phase adjustment for the respective ones of the number of sub-apertures;
        adjust the weighted uplink signal by a third gain and a third phase adjustment selected to compensate for a hardware gain and a phase difference between a transmit and a receive path for each one of the number of sub-apertures; and
        transmit the adjusted weighted uplink signal via each one of the number of sub-apertures.

2. The ground terminal apparatus of claim 1, wherein an uplink signal is sent via only one antenna sub-aperture through a power amplifier (PA) with a higher gain to compensate for a lower gain of the only one antenna sub-aperture.

3. The ground terminal apparatus of claim 1, wherein the at least one antenna aperture are dish antennas.

4. A method of forming antenna beams toward at least one target coverage cell, comprising:
    scheduling a first plurality of broad beam transmissions covering a first area during at least a first time slot of a plurality of time slots;

scheduling a second plurality of focused beam transmissions covering a smaller area within the first area during at least a second time slot of the plurality of time slots;

for each time slot of the plurality of time slots:
generating at least one beam that covers the at least one target coverage cell;
wherein the at least one beam encompasses at least one ground terminal of a set of ground terminals within the at least one target coverage cell that is configured to modify a downlink signal with a gain and a phase adjustment to form a received beam based at least in part on the modified downlink signal; and
receiving an adjusted weighted uplink signal from the at least one ground terminal, the adjusted weighted uplink signal comprising an uplink signal that has been weighted by a second gain and a second phase adjustment corresponding to a gain and the phase adjustment for respective ones of a number of sub-apertures and adjusted by a third gain and a third phase adjustment to compensate for a hardware gain and a phase difference between a transmit and a receive path for each one of the number of sub-apertures.

5. The method of claim 4, wherein the scheduling of the second plurality of focused beam transmissions is based at least in part on cross-beam interference measurements.

6. The method of claim 4, wherein the scheduling of the second plurality of focused beam transmissions is based at least in part on dedicated bandwidth requirements.

7. The method of claim 4, wherein the scheduling of the first plurality of broad beam transmissions is based at least in part on shared bandwidth requirements.

8. The method of claim 4, wherein generating the at least one beam comprises generating multiple beams that collectively comprise different frequencies for one or more co-active cells.

9. The method of claim 4, wherein generating the at least one beam comprises generating multiple beams at a same frequency for one or more co-active cells.

10. An unmanned aerial vehicle (UAV) apparatus configured to form antenna beams toward at least one target coverage cell, comprising:
an antenna system comprised of at least one antenna aperture configured to form at least one beam toward a location;
the at least one antenna aperture configured to form a broad beam to cover a first area at one or more first data rates, and a focused beam covering a smaller area within the first area at one or more second data rates, the one or more second data rates being greater than the one or more first data rates;
a radio transmitter configured to transmit at least a first signal to a set of ground terminals within the at least one target coverage cell;
wherein the first transmitted signal encompasses at least one ground terminal of a set of ground terminals within the at least one target coverage cell that is configured to modify a downlink signal with a gain and a phase adjustment to form a received beam based at least in part on the modified downlink signal;
a radio receiver configured to receive at least a second signal from a set of ground terminals within the at least one target coverage cell;
wherein the second received signal comprises an adjusted weighted uplink signal from the at least one ground terminal, the adjusted weighted uplink signal comprising an uplink signal that has been weighted by a second gain and a second phase adjustment corresponding to a gain and the phase adjustment for respective ones of a number of sub-apertures and adjusted by a third gain and a third phase adjustment to compensate for a hardware gain and a phase difference between a transmit and a receive path for each one of the number of sub-apertures;
wherein the transmission and reception of signals can be switched between the broad beam and the smaller focused beam;
a processor sub-system, the processor sub-system configured to cause generation of the at least one beam that covers the at least one target coverage cell; and
wherein the at least one beam encompasses at least one ground terminal of the set of ground terminals.

11. The UAV apparatus of claim 10, further comprising a scheduler configured to determine one or more pointing angles of the smaller focused beam based at least in part on a determination of cross-beam interference.

12. The UAV apparatus of claim 11, further comprising one or more instructions, the one or more instructions, when executed by the processor sub-system, are further configured to cause the UAV apparatus to point the smaller focused beam at a position coordinate of the at least one ground terminal.

13. The UAV apparatus of claim 12, further comprising one or more additional instructions, the one or more additional instructions, when executed by the processor sub-system, are further configured to cause the UAV apparatus to:
measure one or more Round Trip Delay (RTD) measurements with the at least one ground terminal at multiple UAV locations within a UAV apparatus' cruising orbit;
convert the one or more RTD measurements to distance measurements between the UAV apparatus and the at least one ground terminal; and
estimate the position coordinate of the at least one ground terminal based on the distance measurements and a corresponding one of the multiple UAV locations corresponding to ones of the distance measurements.

14. The UAV apparatus of claim 10, wherein the at least one antenna aperture is further configured to form a second smaller focused beam covering a second smaller area within the first area; and
wherein a same frequency is used for the smaller focused beam and the second smaller focused beam.

15. The UAV apparatus of claim 10, wherein:
an available bandwidth on an uplink path and a downlink path is divided into a plurality of time slots;
the UAV apparatus further comprises a scheduler to assign at least one time slot of the plurality of the time slots for simultaneous use by multiple ground terminals of the set of ground terminals, and at least one time slot for exclusive use by one ground terminal of the set of ground terminals; and
the scheduler assigns the at least one time slot for simultaneous use to the broad beams and the at least one exclusive use time slot to the smaller focused beams.

16. The UAV apparatus of claim 10, wherein:
the at least one beam is fixed with respect to the UAV apparatus; and
the at least one ground terminal is configured to request handoff based at least in part on a first signal quality metric of the at least one beam and a second signal quality metric associated with another UAV apparatus.

* * * * *